(12) United States Patent
Zhou et al.

(10) Patent No.: US 8,855,446 B2
(45) Date of Patent: Oct. 7, 2014

(54) ACCELERATED VIDEO COMPRESSION MULTI-TAP FILTER AND BILINEAR INTERPOLATOR

(75) Inventors: Bo Zhou, San Diego, CA (US); Mao Zeng, Austin, TX (US); Junchen Du, San Diego, CA (US); Lucian Codrescu, Austin, TX (US); Suhail Jalil, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 13/450,734

(22) Filed: Apr. 19, 2012

(65) Prior Publication Data

US 2013/0279827 A1      Oct. 24, 2013

(51) Int. Cl.
*G06K 9/32* (2006.01)

(52) U.S. Cl.
USPC .......................................................... 382/300

(58) Field of Classification Search
CPC ..... G06T 3/4007; G06T 3/4023; G06T 5/005; G06T 5/20; G06T 7/403; H04N 5/14; H04N 7/012; H04N 7/0132; H04N 7/0135; H04N 7/0152; H04N 7/125; H04N 11/048; H04N 19/00757
USPC ............ 382/257, 258, 300; 348/392.1, 405.1, 348/419.1, 423.1, 424.1, 430.1; 358/525; 375/240.17, 240.21; 708/290, 313, 847
See application file for complete search history.

(56) References Cited

U.S. PATENT DOCUMENTS

| | | | |
|---|---|---|---|
| 5,500,811 A | 3/1996 | Corry | |
| 6,061,521 A | 5/2000 | Thayer et al. | |
| 6,175,592 B1 | 1/2001 | Kim et al. | |
| 6,188,803 B1 | 2/2001 | Iwase et al. | |
| 6,470,370 B2 | 10/2002 | Fischer et al. | |
| 8,463,837 B2 * | 6/2013 | Chen et al. | 708/603 |
| 2004/0139138 A1 | 7/2004 | Chen et al. | |

FOREIGN PATENT DOCUMENTS

EP      1605704 A2      12/2005

OTHER PUBLICATIONS

International Search Report and Written Opinion—PCT/U82013/037206—ISA/EPO—Aug. 1, 2013.
Loinaz M.J., et al., "A 200-mW, 3.3-V, CMOS Color Camera IC Producing 352 288 24-b Video at 30 Frames/s", IEEE Journal of Solid-State Circuits, IEEE Service Center, Piscataway, NJ, USA, vol. 33, No. 12, Dec. 1, 1998, XP011060893, ISSN: 0018-9200 abstract; figures 1, 10 Sections II.E, III.A.
Nunez-Yanez J.L., et al., "Multi-standard reconfigurable motion estimation processor for hybrid video codecs", IET Computers and Digital Techniques., vol. 5, No. 2, Mar. 4, 2011, pp. 73-85, XP006037606, ISSN: 1751-861X, DOI: 10.1049/1ET-CDT:20090070 abstract; figures 7, 12-14; table 1 Sections 2.2, 4.2, 6.

\* cited by examiner

*Primary Examiner* — Jose Couso
(74) *Attorney, Agent, or Firm* — Peter Michael Kamarchik; Nicholas J. Pauley; Joseph Agusta

(57) ABSTRACT

A set of even interpolated sub-pixels is formed based on a pixel window and a tap coefficient register having a tap coefficient set, the pixel window is shifted and, applying the tap coefficient register a set of odd interpolated pixels is formed. The set of even interpolated sub-pixels and the set of odd interpolated sub-pixels are accumulated, repeatedly, until a termination condition is let. In the accumulating, the tap coefficient register is updated with another tap coefficient set, the pixel window is shifted, and the even interpolated pixels are incremented, the pixel window is then shifted again and the odd interpolated pixels are incremented.

22 Claims, 14 Drawing Sheets

FIG. 1

ACCELERATED VIDEO COMPRESSION MULTI-TAP FILTER AND BILINEAR INTERPOLATOR

FIELD OF DISCLOSURE

The present disclosure relates to video compression and, more particularly, to multi-tap motion compensation filters and bilinear interpolation.

BACKGROUND

A video output from a digital video camera is generally a sequence of frames, each frame being a snapshot generated by the camera's row-column array of what is often millions of optical sensors. Each frame is a time sample of the impinging image and, therefore, the rate of the frames can be associated with the highest rate of motion the user desires to capture. For example, a frame rate of 15 to 30 frames per second can capture the fastest motion perceptible to the unaided human eye. Higher frame rates, for example in excess of a million frames per second, can be used for capture of high speed motion, e.g., a hummingbird's wing motion or a ballistic event.

Even at lower frame rates, though, if no processing is performed on the data generated by the optical sensors to remove what can be termed unnecessary information, the amount of data required to communicate and store the image can be problematic. Examples of unnecessary data include more image detail than needed, or data that carries little actual information, e.g., adds little or nothing to what has already been carried in a preceding frame. The latter type of information can be termed "inter-frame" redundancy. One example can be a video camera imaging a person running against an unchanging backdrop. In such an image, an unfiltered sequence of frames would carry significant amounts of unneeded information, because in fact the only change from frame to frame may be the position of the man.

Various algorithms are known that exploit this redundancy, for example, by sending only intermittent frames with a complete or substantially complete content, and sending the succeeding or intervening "frames" as only the changes, or delta, from the previous frame. The change or delta that is sent can include a displacement of one or more objects, and such displacements can be represented with one or more motion vectors.

Motion vectors in accordance with various video-encoding standards, for example, H.263, H.264, MPEG-2, and MPEG-4, can be generated with a sub-pixel resolution, such as half-pixel and/or quarter-pixel resolution. Since sub-pixel resolution is greater than the original image, motion vectors with sub-pixel resolution can be estimated by interpolating between original pixels, and further interpolating between interpolated pixels. One well-known problem associated with estimating, or interpolating sub-pixels is computational complexity. A reduction of the computational complexity associated with the estimation of motion vectors with sub-pixel resolution has been long known as desirable.

SUMMARY

One method in accordance with one or more exemplary embodiments can provide an interpolating of sub-pixels for a pixel array and can include forming a set of even interpolated sub-pixels, based on a window register of pixels from the pixel array and a tap coefficient register having a given tap coefficient set, updating the window register with another of the pixels, forming a set of odd interpolated sub-pixels, based on said window register and said tap coefficient register, and accumulating the even interpolated sub-pixels and the odd interpolated sub-pixels until a given termination condition is met. In an embodiment, each accumulating can include updating the tap coefficient register based on another tap coefficient set and updating the window register with another of the pixels, incrementing the even interpolated sub-pixels based on the window register and the tap coefficient register, another updating the window register with another of the pixels, and incrementing the odd interpolated sub-pixels, based on the window register and the tap coefficient register. In an aspect, methods can include, upon the termination condition being met, outputting the set of even interpolated sub-pixels and the set of odd interpolated sub-pixels.

In an aspect, forming the set of even interpolated sub-pixels forms the set to include four even interpolated sub-pixels, each of the four even interpolated sub-pixels having a sum of two products, and in a further aspect forming the set of odd interpolated sub-pixels forms the set to include four odd interpolated sub-pixels, each of the four odd interpolated sub-pixels having a sum of a corresponding two products.

In an aspect, forming the set of even interpolated sub-pixels can take place during a single machine cycle and, likewise, forming the set of odd interpolated sub-pixels can take place during a single machine cycle.

In an aspect, each incrementing the even interpolated sub-pixels can include incrementing each of the four even interpolated sub-pixels with a sum of another corresponding two products and, in a related aspect, each incrementing the odd interpolated sub-pixels can include incrementing each of the four odd interpolated sub-pixels with a sum of another corresponding two products.

In an aspect, updating the tap coefficient register and updating the window register, combined with incrementing the even interpolated sub-pixels, can take place during a single machine cycle, and in a further aspect another updating the window register combined with incrementing the odd interpolated sub-pixels can take place during a single machine cycle.

An embodiment can include or provide an apparatus for generating interpolated pixels for a pixel array, and the aspect can include, according to various aspects, means for forming a set of even interpolated sub-pixels, based on a window of pixels from the pixel array and a given tap coefficient set, means for updating the window with another of the pixels, means for forming a set of odd interpolated sub-pixels, based on the window of pixels and said tap coefficient set, and means for accumulating the even odd interpolated sub-pixels and the odd interpolated sub-pixels until a given termination condition is met. In an aspect, the means for accumulating can be configured to update the tap coefficient set and update the window with another of the pixels, increment the even interpolated sub-pixels based on the window of pixels and the tap coefficient set, update the window of pixels with another of the pixels, and increment the odd interpolated sub-pixels, based on the window of pixels and the tap coefficient set. In one embodiment an apparatus can include means for outputting the even interpolated sub-pixels and the odd interpolated sub-pixels when the given termination condition is met.

An embodiment can include or provide an computer-readable medium comprising instructions, which, when executed by a processor apparatus in a wireless communications system, cause the processor apparatus to perform operations carrying out a method for generating interpolated pixels for a pixel array, and in accordance with various aspects, the instructions can cause the processor apparatus to form a set of even interpolated sub-pixels, based on a window of pixels from the pixel array and a given tap coefficient set, update the window with another of the pixels, form a set of odd interpolated sub-pixels, based on the window of pixels and said tap coefficient set, and accumulate the set of even and odd interpolated sub-pixels until a given termination condition is met. In an embodiments, the instruction can cause the processor apparatus to accumulate by updating the tap coefficient set and updating the window of pixels with another of the pixels, incrementing the even interpolated sub-pixels based on the window of pixels and the tap coefficient set, another updating of the window of pixels with another of the pixels, and incrementing the odd interpolated sub-pixels, based on the window of pixels and the tap coefficient set. The instructions can, in an aspect, cause the processor apparatus to output the even interpolated sub-pixels and the odd interpolated sub-pixels.

An embodiment can include or provide apparatus for generating interpolated pixels for a pixel array, and the apparatus can include a logic circuit having an input for receiving pixels from a pixel array, and according to various aspects the logic circuit can be configured to form a set of even interpolated sub-pixels, based on a window of pixels from the pixel array and a given tap coefficient set, update the window with another of the pixels, form a set of odd interpolated sub-pixels, based on the window of pixels and said tap coefficient set, and accumulate the even odd interpolated sub-pixels and the odd interpolated sub-pixels until a given termination condition is met. According to various aspects the logic circuit can be configured to accumulate by updating the tap coefficient set and updating the window with another of the pixels, incrementing the even interpolated sub-pixels based on the window of pixels and the tap coefficient set, updating the window of pixels with another of the pixels, and incrementing the odd interpolated sub-pixels, based on the window of pixels and the tap coefficient set. In a further aspect the logic circuit can be configured to output the even interpolated sub-pixels and the odd interpolated sub-pixels when the given termination condition is met.

BRIEF DESCRIPTION OF THE DRAWINGS

The accompanying drawings are presented to aid in the description of embodiments of the invention and are provided solely for illustration of the embodiments and not limitation thereof.

FIG. 1 illustrates a one example arrangement of integer pixels, and interpolated fractional pixels.

DETAILED DESCRIPTION

Figure 2:
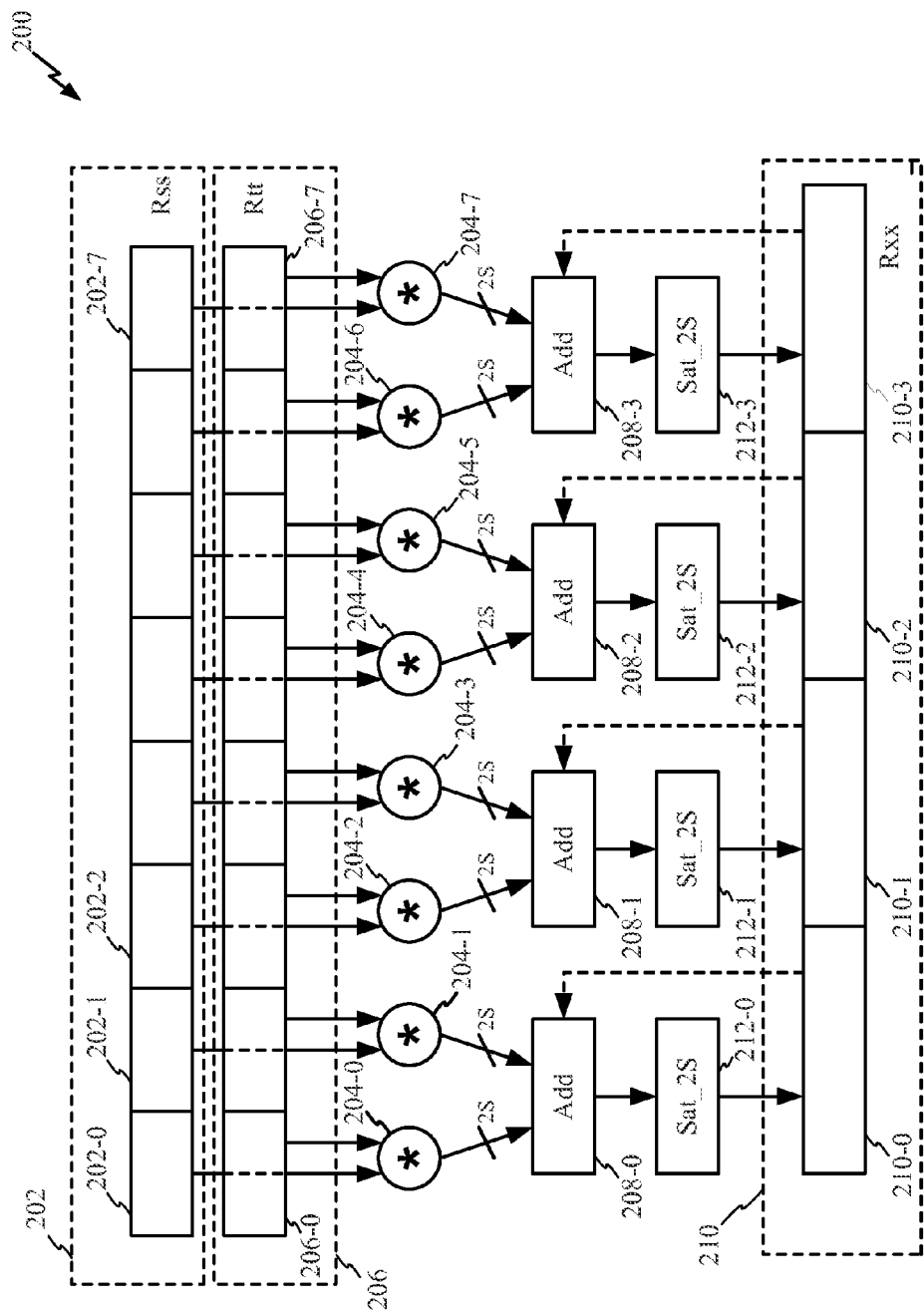
FIG. 2 shows a functional block diagram of one example reduced cycle multi-tap interpolating filter according to one exemplary embodiment.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/ or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

In video compression techniques such as H.264, accuracy of motion compensation (MC) is in units of, for example, one quarter of the distance between luma samples. In instances where the motion vector points to an integer-sample position, the prediction signal consists of the corresponding samples of the reference picture. In instances where the motion vector points to other than an integer-sample position, the corresponding sample is obtained using interpolation to generate non-integer positions. Prediction values at half-sample positions can be obtained by applying a one-dimensional 6-tap finite impulse response (FIR) filter horizontally and vertically. Prediction values at quarter-sample positions can be generated by averaging samples at integer- and half-sample positions.

Figure 1:
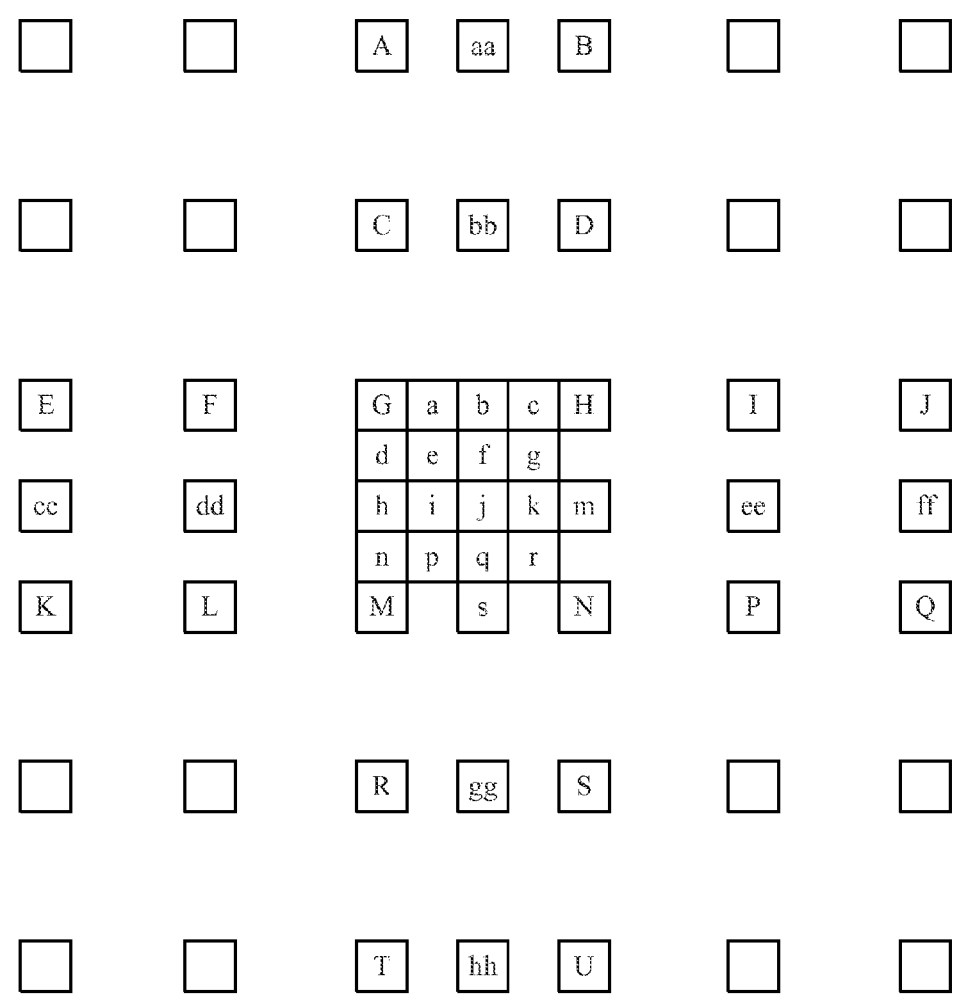

FIG. 1 illustrates the fractional sample interpolation for samples a-k and n-r. The samples at half-sample positions labeled b and h are derived by first calculating intermediate values $b_1$ and $h_1$, respectively by applying the 6-tap filter as follows:

$$b_1 = (E - 5F + 20G + 20H - 5I + J) \quad \text{Eq. (1)}$$

$$h_1 = (A - 5C + 20G + 20M - 5R + T) \quad \text{Eq. (2)}$$

The final prediction values for locations b and h can be obtained as follows and clipped to the range of 0-255:

$$b = (b_1 + 16) \gg 5 \quad \text{Eq. (3)}$$

$$h = (h_1 + 16) \gg 5 \quad \text{Eq. (4)}$$

The samples at half sample positions labeled as j can be obtained by $$j_1 = cc - 5dd + 20h_1 + 20m_1 - 5ee + ff \quad \text{Eq. (5)}$$

where intermediate values denoted by cc, dd, ee, $m_1$, and ff are obtained in a manner similar to $h_1$. The final prediction value j can then computed as $$j = (j_1 + 512) \gg 10 \quad \text{Eq. (6)}$$

and clipped to the range of 0 to 255.

The two alternative methods of obtaining the value of j illustrate that the filtering operation is separable for the generation of the half-sample positions.

Referring still to FIG. 1, samples at quarter-sample positions labeled as a, c, d, n, f, i, k, and q are derived by averaging with upward rounding of the two nearest samples at integer- and half-sample positions as, for example, by $$a = (G + b + 1) \gg 1 \quad \text{Eq. (7)}$$

The samples at quarter-sample positions labeled as e, g, p, and r are derived by averaging with upward rounding of the two nearest samples at half-sample positions in the diagonal direction as, for example, by $$e = (b + h + 1) \gg 1 \quad \text{Eq. (8)}$$

The prediction values for the chroma component can be obtained by bilinear interpolation. Since the sampling grid of chroma has lower resolution than the sampling grid of the luma, the displacements used for chroma have one-eighth sample position accuracy.

Referring to FIG. 2, the example multi-tap merged interpolating filter 200 includes a pixel window register 202, an array of multipliers, in this example 8 multipliers 204-0, 204-1 . . . 204-7 (referenced generically as "multipliers 204" or "multiplier array" with "204" not explicitly appearing on the figures), and tap coefficient set register 206. The pixel window register can have a plurality, in this example, 8 pixel registers 202-0, 202-1 . . . 202-7 (referenced generically as "202-x," which does not appear on the figures). In an aspect, the 8 pixel registers 202-x forming the pixel window register 202 can be configured to be loadable in parallel, to have parallel outputs, and be configured to be selectively shifted, in unison in a bucket-brigade manner, for example in a "direction" shown as right-to-left in FIG. 2. Alternatively stated, in an aspect the pixel registers 202-x can be configured such that the pixel window register 202 provides an 8-pixel, parallel-in/parallel-out shift register function. The pixel registers 202-x can be S-bits wide. One example value of "S," without limitation, is 8 bits. One example implementation of the pixel window register 202 can be a first-in-first-out (FIFO) or FIFO pipeline, having parallel load and output features. With respect to specific structure for the pixel window register 202, persons of ordinary skill in the art applying the know-how such persons possess to the present disclosure can readily identify various structural implementations and, therefore, further detailed description of such structures is omitted.

As described in greater detail at later sections, the "right-to-left" shifting of S-bit pixel data through the pixel window register 202 can provide, in part, convolving-type operations. One example, described in later sections in reference to FIG. 3, can effectuate a shifting of a window encompassing 8 pixels (not shown in FIG. 2) across a row (not shown in FIG. 2) of an example region of a pixel array (not shown in FIG. 2).

With continuing reference to FIG. 2, for convenience in referencing the figures in describing operations further to certain aspects, multipliers 204-0 and 204-1 will be alternatively referenced as a "first multiplier pair" 204-0/1, multipliers 204-2 and 204-3 as a "second multiplier pair" 204-2/3; multipliers 204-4 and 204-5 as a "third multiplier pair" 204-4/5; and multipliers 204-6 and 204-7 as a "fourth multiplier pair" 204-6/7. It will be understood that the term "multiplier pair" is only for describing example operations with respect to certain aspects, and is not intended to define hardware architecture. On the contrary, as will be understood from the description in greater detail at later sections, in one aspect the outputs of multipliers 204 can be coupled to summing devices 208-y in arrangements different than depicted in FIG. 2.

Referring still to FIG. 2, in an aspect each of the multipliers 204 can be configured with a first operand port (shown but not separately labeled) coupled, or capable of being coupled to a corresponding one of the above-described pixel registers 202-x, and a second operand port (shown but not separately numbered) coupled to, or capable being coupled to a corresponding tap coefficient register 206-x of the tap coefficient set register 206. In an aspect, the tap coefficient set register 206 can include a first tap coefficient register 206-0, a second tap coefficient register pair 206-1 and so forth ending at, for example, an eighth tap coefficient register 206-7.

In an aspect the multipliers 204 can be configured to perform fixed-point multiplication, and this will be assumed for describing example operations. This assumption, though, is only to facilitate description of example processes without introducing complexity not related to the concepts, and is not intended to limit the scope of the contemplated embodiments. On the contrary, it will be readily understood by persons of ordinary skill in the art upon reading this disclosure that an embodiment can be practiced using floating-point arithmetic.

Referring still to FIG. 2, as will be described in greater detail at later sections, in an aspect the multi-tap merged interpolating filter 200 can be configured to store in a storage (not explicitly shown in FIG. 2) a plurality of sets of tap coefficients (not specifically shown in FIG. 2) and to selectively retrieve such sets of tap coefficients and load these into the tap coefficient set register 206. It will be understood that the pixel window register 202 and the tap coefficient set register 206 can have identical structure, for example each can be a logically designated register in a register array (not explicitly shown).

Referring still to FIG. 2, in one configuration the respective outputs of the first multiplier pair 204-0, 204-1 can be switched, routed or otherwise coupled to operand input ports (shown but not separately numbered) of a first summing device 208-0, the respective outputs of the second multiplier pair 204-2, 204-3 to feed operand input ports (shown but not separately numbered) of a second summing device 208-1, the respective outputs of the third multiplier pair 204-4, 204-5 to feed operand input ports (shown but not separately numbered) of a third summing device 208-2, and the respective outputs of the fourth multiplier pair 204-6, 204-7 to feed operand input ports (shown but not separately numbered) of a fourth summing device 208-3. For brevity in describing example operation, the first summing device 208-0, second summing device 208-1, third summing device 208-2 and fourth summing devices 208-3 are also generically referenced, in an individual sense, as "a summing device 208-y" and collectively referenced as "summing devices 208," with it being understood that labels "208-y" and "208" do not explicitly appear on the figures.

With respect to switching, routing or coupling logic (not shown) for effecting the depicted and described couplings of the multipliers 204 to the summing devices 208, in one aspect persons of ordinary skill in the art can, based on the present disclosure, select or otherwise implement such logic by applying conventional digital signal processor design techniques and, therefore, further detailed description of the switching, routing or coupling logic is omitted.

With continuing reference to FIG. 2, in an aspect the multi-tap merged interpolating filter 200 can include an accumulator 210 having, for example, four accumulator registers 210-0, 210-1, 210-2, 210-3 (referenced in an individual generic sense as "accumulator register 210-y," and understood that "210-y" does not explicitly appear on the figures). It will be understood that the quantity of four is only one example, and this not intended as a limitation on the scope of any embodiment. It will also be understood that the accumulator registers 210-0, 210-1, 210-2, and 210-3 are not necessarily separately controlled or controllable registers and may instead be fields of the accumulator 210. Further, it is contemplated that the accumulator registers 210-0, 210-1, 210-2, and 210-3 may be implemented as a sub-set of four fields or the equivalent of an implemented accumulator 210 having more than four fields or the equivalent.

Referring still to FIG. 2, in one aspect the output (shown but not separately numbered) of each summing device 208 can directly feed a corresponding accumulator register 210-y. In a further aspect, the FIG. 2 multi-tap merged interpolating filter 200 can include saturation logic, either within or in association with the summing devices 208, such as the depicted 2S-bit signed saturation logic 212-0, 212-1, 212-2, 212-3 (referenced collectively as "2S-bit signed saturation logic 212" and in an individual generic sense as "saturation logic" 212-y, it being understood that the labels "212" "212-y" do not explicitly appear on the figures). In the FIG. 2 example according to this aspect, a saturation logic 212-y can be logically disposed between the output (shown by not separately numbered) of each summing device 208-y and a corresponding accumulator register 210-y. It will be understood that "logically disposed" in this and, in other instances in this description, can mean that the "2S-bit signed saturation logic" 212-y is not necessarily a separate or dedicated hardware. For example, in one aspect, each 2S-bit signed saturation logic 212-y can be incorporated as a programmable feature, into logic (not separately shown) implementing the corresponding summing device 208-y. With respect to specific structure for the 2S-bit signed saturation logic 212, persons of ordinary skill in the art can, in view of the present disclosure, readily identify techniques and structures for implementing such logic by applying standard digital design techniques and technology known to such persons to the present disclosure. Therefore, further detailed description of structures for the 2S-bit signed saturation logic 212 is omitted.

With respect to operations and functions of the 2S-bit signed saturation logic 212, these will be further understood by an example in reference to the previously described example S of 8, meaning (in this example) that the window register 202 holds 8-bit unsigned data, and the tap coefficient data stored in the tap coefficient set register 206 is signed 8-bit data. The value "2S" in the context of 2S-bit signed saturation logic 212 is, in this example, therefore equal to 16. An example feature of 2S-bit signed saturation logic 212 with S equal to 8 and 2S equal to 16 can be seen by reference to the first multiplier pair 204-0, 204-1, summing device 208-0 and 2S-bit signed saturation logic 212-0. More particularly, multiplier 204-0 can multiply an 8-bit unsigned pixel data from the pixel register 202-0 by a corresponding signed 8-bit tap coefficient from the tap coefficient register 206-0, and generate one signed 16-bit product and, similarly, multiplier 204-1 can multiply another 8-bit unsigned pixel data from the pixel register 202-1 by a corresponding signed 8-bit tap coefficient from the tap coefficient register 206-1, and generate another signed 16-bit product. The two respective signed 16-bit products are input to two operand input ports (shown but not separately numbered) of the summing device 208-0. In an aspect, the first summing device 208-0 can be selectively configured to operate in an accumulator mode, for example by enabling an input operand port (shown but not separately labeled) coupled to the accumulator first register 210-0, or by enabling logic (not shown) internal to the first summing device 208-0. The first summing device 208-0 can add (or subtract, depending on the sign) the signed 16-bit products, and current content of the accumulator first register 210-0 when operating in an accumulator mode, can feed a sum-of-products result or accumulated sum-of-products result to the 2S-bit signed saturation logic 212-0. This sum-of-products result or accumulated sum-of-products result, which if it exceeds 16 bits can be saturated at 16 bits by the 2S-bit signed saturation logic 212-0, can then be loaded into the first accumulator register 210-0. The remaining multipliers 204-2, 204-3 . . . 204-7, and remaining summing devices 208-1, 208-2 and 208-3 can operate likewise on content of corresponding pixel registers 202-x from the pixel window register 202 and content of tap coefficient registers 206-x from the tap coefficient register 206, and feed a respective 16-bit sum-of-products or accumulated sum-of-products result into a corresponding one of the remaining accumulator registers 210-1, 210-2, and 210-3.

Figure 3:
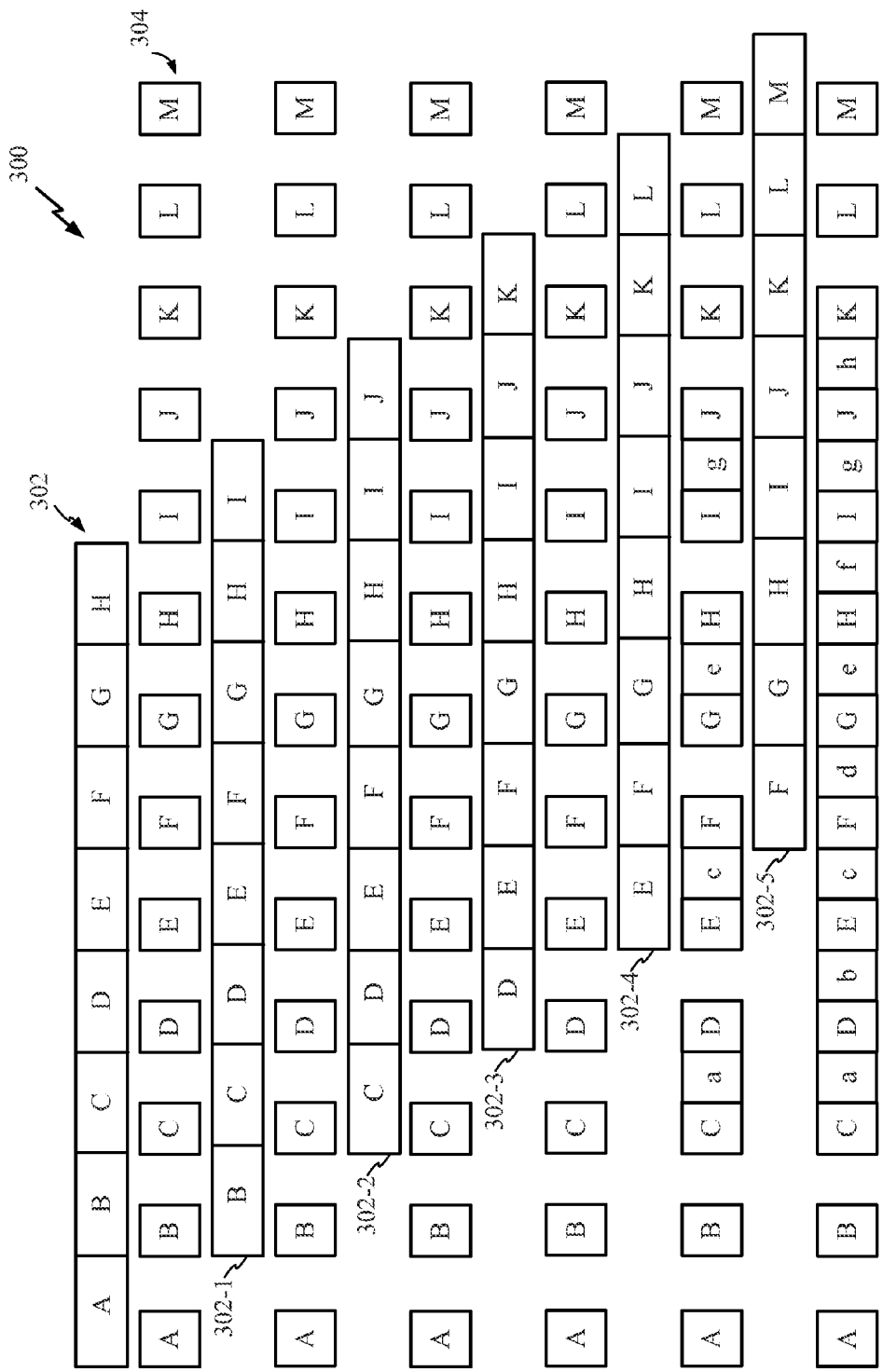
FIG. 3 shows a graphical model of one example input sequence of pixels, showing a pixel window being displaced incrementally right to left along a row of image pixels, and generating corresponding interpolated half-pixels, in a processing of a reduced cycle multi-tap interpolating filter according to one or more exemplary embodiments.

FIG. 3 shows a graphical model 300 of a stepping of a pixel window 302 through a six step sequence of positions along a row 304 of thirteen image pixels, labeled A, B, C . . . M. The pixel window 302 is shown as having a width of 8 bits, but this is only an example, not intended to limit the scope of any of the embodiments. At the starting position 302-0 the pixel window 302 spans (assuming the example width of 8 pixels) pixels A, B, C, D, E, F, G, and H, and at the ending position 302-5 spans pixels F, G, H, I, J, K, L, and M. In one aspect the six step sequence can be viewed as three "even" steps interleaved with three "odd" steps. It will be understood that the labeling of "even" and "odd" is arbitrary. In a related aspect, and as will be described in greater detail at later sections, the FIG. 2 multi-tap merged interpolating filter 200 can be configured and operated through a sequence of six states or configurations, each state corresponding to one of the "even" or "odd" steps of the pixel window 302 in the sequence 302-0 . . . 302-5.

Referring to FIGS. 2 and 3, the pixel window register 202 of the FIG. 2 multi-tap merged interpolating filter 200, at each of these "even" or "odd" steps of the FIG. 3 pixel window 302 in the sequence 302-0 . . . 302-5, is loaded with the pixels spanned by the FIG. 3 pixel window 302 at that position. The FIG. 2 multi-tap merged interpolating filter 200, in one aspect, can perform an interpolating filter process in accordance with one or more exemplary embodiment at each of the six FIG. 3 pixel window 302 positions. In an aspect, as will be further understood from later description of example operations, the interpolating filter process performed by the FIG. 2 multi-tap merged interpolating filter 200 at each of the six FIG. 3 pixel window 302 positions can be performed in one machine cycle.

For convenience in describing example interpolating filter processes performed by the FIG. 2 multi-tap merged interpolating filter 200 at states corresponding to the "even" FIG. 3 pixel window 302 positions 302-0, 302-2, and 302-4, these example interpolating filter processes will be alternatively referenced as "even" machine cycles. Likewise, interpolating filter processes performed by the multi-tap merged interpolating filter 200 at states corresponding to the "odd" FIG. 3 pixel window 302 positions 302-1, 302-3, and 302-5 will therefore be alternatively referenced as "odd" machine cycles.

One example six-step or six-state reduced cycle interpolating filter process in a method and system according to the exemplary embodiments is described in greater detail below in reference to FIGS. 4, 5, 6, 7, 8, and 9, together with FIGS. 2 and 3. In overview, the examples can include a first "even" machine cycle, such as described in reference to FIG. 4, in which the pixel window register 202 can be loaded with the FIG. 3 pixels spanned by the pixel window 302 at the first "even" position 302-0, and operated upon by the tap coefficient set register 206 loaded with a first tap coefficient set. The operation can generate and form in the accumulator 210 initial values for the FIG. 3 four "even" interpolated half-pixels a, c, e, and g. In an aspect, the formed four "even" interpolated half-pixels a, c, e, and g can be offloaded to a memory (not show). The offloading, as will be understood, can provide for an interleaving of the "even" and "odd" machine cycles, with neither interfering with the other's use of the accumulator 210. As will be appreciated, the interleaving feature can provide, among other benefits, a merged interpolating filter in practices according to the various exemplary embodiments.

Figure 5:
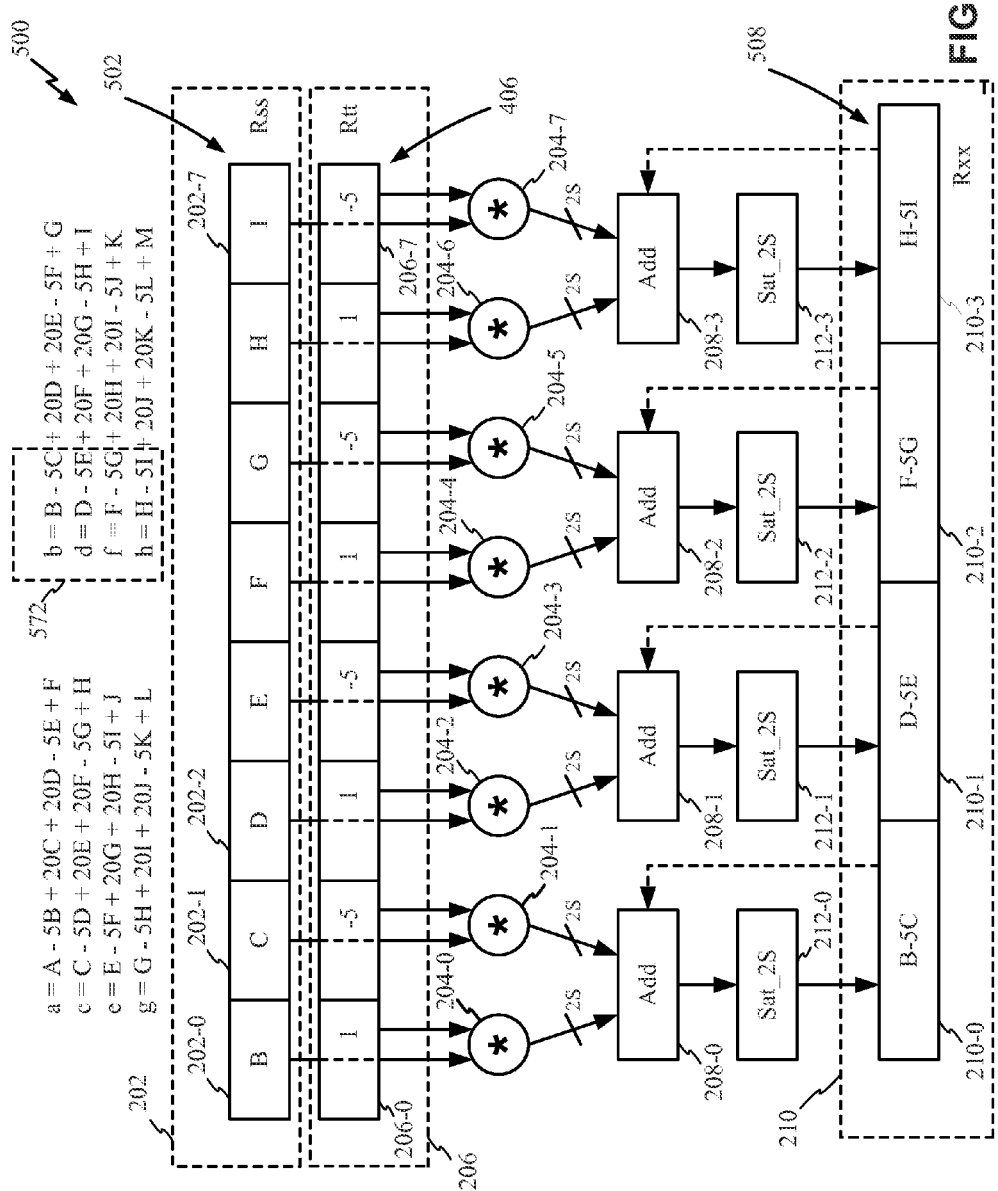
FIG. 5 shows on the FIG. 2 functional block diagram one example machine cycle, operating on a pixel window corresponding to a FIG. 3 second pixel window position, generating starting values of a second plurality of interpolated half-pixels, in the processing of one reduced cycle multi-tap interpolating filter according to one exemplary embodiment.

In an aspect, as will be further understood from the description in greater detail in reference to FIG. 5, in a first "odd" machine cycle the pixel window register 202 can be updated to hold the pixels spanned by the pixel window 302 at the first "odd" position 302-1 and the pixel window register content operated upon by the tap coefficient set register 206 having, in one aspect, the same first tap coefficient set used for the first "even" machine cycle. This operation can, in an aspect, form initial values for the FIG. 3 example four "odd" half-pixels b, d, f and h, which can be then offloaded to memory. As described in greater detail in reference to FIG. 6, a second "even" machine cycle can include re-loading the accumulator 210 with the earlier-formed four "even" interpolated half-pixels a, c, e, and g, the pixel window register 202 updated to have the FIG. 3 pixels spanned by the pixel window 302 at the second "even" position 302-2, and the tap coefficient set register 206 loaded with a second tap coefficient set. The tap coefficient set register 206 having the second tap coefficient set can then operate on the pixel window register 202 content having the FIG. 3 "even" position 302-2 pixels to generate incrementing values (which can be positive or negative in sign) and these can adjust or increment, in the accumulator 210, the earlier-formed four "even" interpolated half-pixels a, c, e, and g. The incremented four "even" interpolated half-pixels a, c, e, and g can be offloaded to memory.

Figure 7:
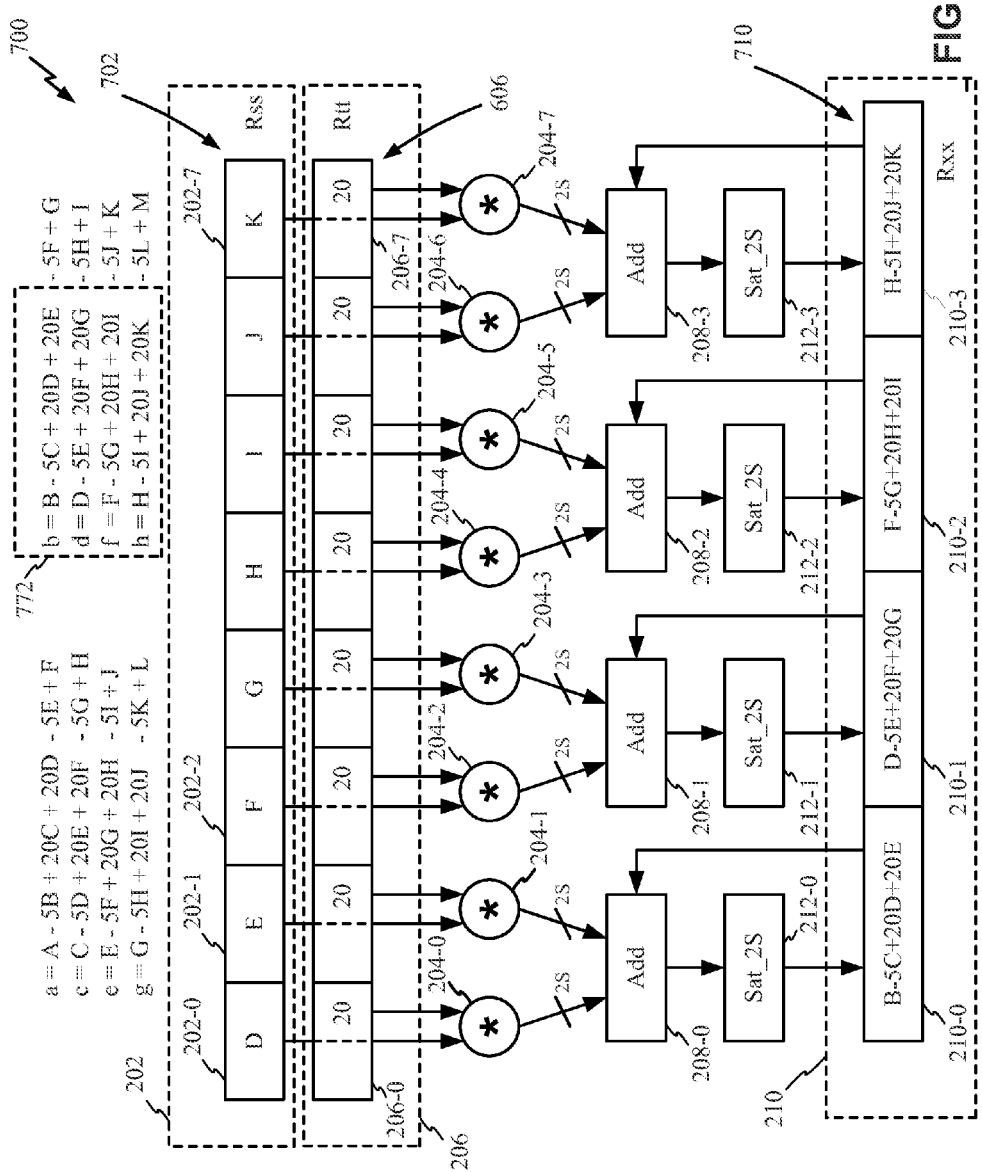
FIG. 7 shows on the FIG. 2 functional block diagram one example next machine cycle, operating on a pixel window corresponding to a FIG. 3 fourth pixel window position, generating first accumulated or updated values of the second plurality of interpolated half-pixels, in the processing of one reduced cycle multi-tap interpolating filter according to one exemplary embodiment.

Next, as described in greater detail in reference to FIG. 7, in a second "odd" machine cycle the accumulator 210 can be loaded with the earlier-formed four "odd" interpolated half-pixels b, d, f, and h, and the pixel window register 202 updated to have the FIG. 3 pixels spanned by the pixel window 302 at the second "odd" position 302-2. The tap coefficient register set 206 can, in one aspect, keep the second tap coefficient set. Then, in a manner similar to the incrementing of the "even" interpolated half-pixels a, c, e, and g, the pixel window register 202 content having the FIG. 3 "even" position 302-2 can be operated upon by the tap coefficient set register 206 to generate incrementing values that can adjust or increment, in the accumulator 210, the earlier-formed four "odd" interpolated half-pixels b, d, f and h, which can then be offloaded to memory.

Figure 8:
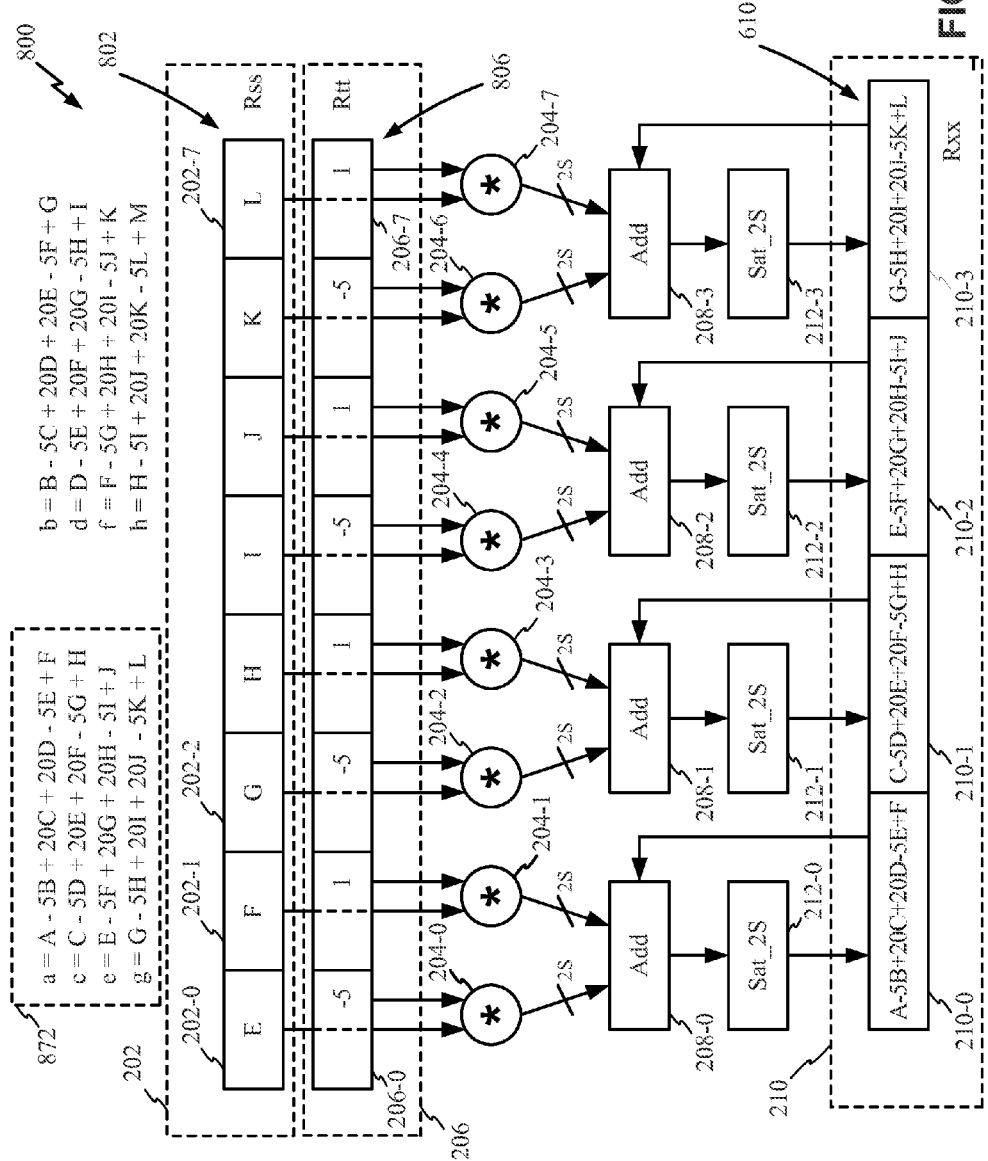
FIG. 8 shows on the FIG. 2 functional block diagram one example final machine cycle, operating on a pixel window corresponding to a FIG. 3 fifth pixel window position, generating final values of the first plurality of interpolated half-pixels, in the processing of one reduced cycle multi-tap interpolating filter according to one exemplary embodiment.

Continuing in overview, as described in greater detail in reference to FIG. 8, a third second "even" machine cycle can includes re-loading the accumulator 210 with the earlier incremented four "even" interpolated half-pixels a, c, e, and g, updating the pixel window register 202 to have the FIG. 3 pixels spanned by the pixel window 302 at the third "even" position 302-4, loading the tap coefficient set register 206 with a third tap coefficient set and, using arithmetic operations substantially the same as the second "even" machine cycle, establishing in the accumulator 210 final values for the four "even" interpolated half-pixels a, c, e, and g. Similarly, as described in greater detail in reference to FIG. 9, the accumulator 210 can be re-loaded with the earlier incremented four "odd" interpolated half-pixels b, d, f and h, and the pixel window register 202 updated to have the FIG. 3 pixels spanned by the pixel window 302 at the third "odd" position 302-5. In an aspect, the tap can maintain the third tap coefficient set, and incrementing values can be generated to establish in the accumulator 210 final values for the four "odd" interpolated half-pixels b, d, f and h. It will be appreciated by persons of ordinary skill in the art upon reading the present disclosure that a merged interpolating filter in practices according to the various exemplary embodiments, by forming and accumulating four "even" interpolated half-pixels a, c, e, and g during a total of three "even" machine cycles, interleaved with forming and accumulating the four "odd" interpolated half-pixels b, d, f and h during a total of three "odd" machine cycles, can provide in just six machine cycles the full set of eight interpolated half-pixels a, b, c, d, e, f, g and h.

The example six-state reduced cycle interpolating filter process in a method and system according to the exemplary embodiments will now be described in greater detail below in reference to FIGS. 4, 5, 6, 7, 8, and 9, together with FIGS. 2 and 3. In one aspect, the first "even" and first "odd" machine cycles can use a first tap coefficient set of [1, −5, 1, −5, 1, −5, 1, −5]. In the figures the first tap coefficient set of [1, −5, 1, −5, 1, −5, 1, −5] is labeled as tap coefficient set register state 406 of the tap coefficient set register 206 appearing in FIGS. 4 and 5. In one related aspect, as reflected by the FIGS. 6 and 7 tap coefficient set register state 606 of the tap coefficient register 206, the second tap coefficient set can be [20, 20, 20, 20, 20, 20, 20, 20] and in one further aspect, as reflected by the FIGS. 8 and 9 tap coefficient set register state 806, the third tap coefficient set can be [−5, 1, −5, 1, −5, 1, −5, 1]. It will be understood that these are only examples of respective values for the first, second and third tap coefficient set and that other values can be used to obtain other desired filter operations. It will also be understood that embodiments are contemplated having more than two sets of tap coefficients.

Before describing example arithmetic operations shown by the FIG. 2 multi-tap merged interpolating filter 200 at its FIG. 4 through FIG. 9 machine states, it will be understood that the description assumes no latches (not shown) inserted in the various data paths, or within the various described logic and arithmetic devices. In other words, referring to FIG. 2, it will be assumed that in one machine cycle pixel values from the pixel window register 202 and tap coefficient values in the tap coefficient set register 206 can pass to the multiplier array 204, be multiplied to form respective products that pass through the summing devices 208, through the 2S-bit saturation logic 212 and are loaded into the accumulator 210. It will be understood that this assumption of no latches is only for purposes of describing example operations without having to describe clock cycle delays due to latches in these data paths. Persons of ordinary skill in the art, though, can readily adapt the described concepts to practices that utilize latches in, for example, the described data paths.

Further, various techniques and structures for implementing the pixel window register 202 with the capability to iterate through the FIG. 3 sequence 302-0 . . . 302-5, and through other pixel window displacements across pixel arrays in practices according to the exemplary embodiment, and for implementing the tap coefficient set register 206, will become apparent to persons of ordinary skill in the art from the present disclosure and, therefore, further detailed description of such techniques and structures is omitted.

For purposes of simplifying description to in reference to FIGS. 4, 5, 6, 7, 8, and 9 of the example six-state reduced-cycle interpolating filter process in a method and system according to the exemplary embodiments, specific operations performed by the 2S-bit saturation logic 212 will be omitted. Persons of ordinary skill in the art having view of the present disclosure can apply general know-how of fixed-point arithmetic operations possessed by such persons to the disclosed concepts to maintain intermediate processing results, and the end result half-pixels a, b . . . h, within a desired numerical range. Description will therefore, except in instances where incidental to subject operations, ignore numerical growth introduced by the multiplication and accumulation operations.

Figure 4:
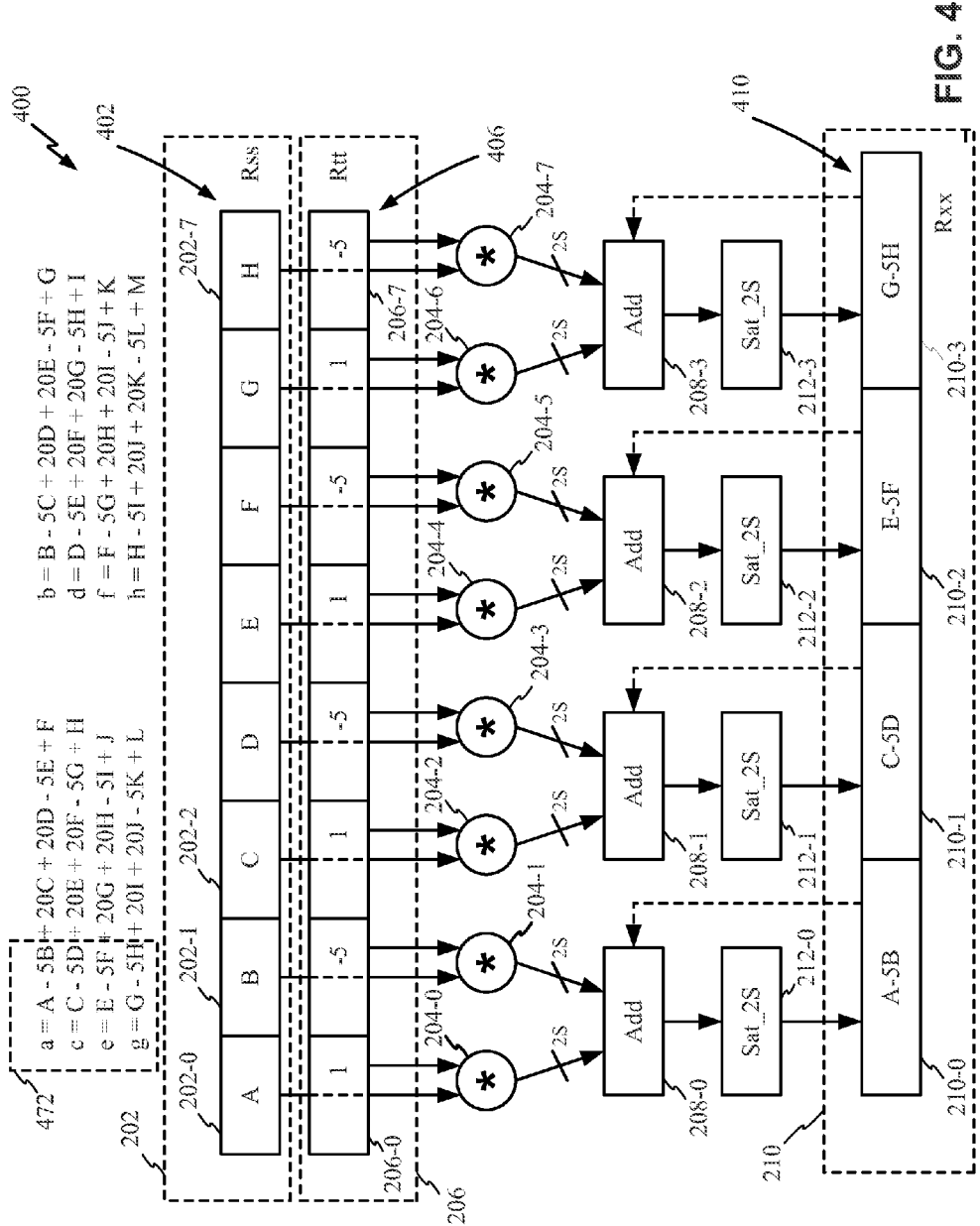
FIG. 4 shows on the FIG. 2 functional block diagram one example machine state for a first "even" machine cycle operating on a pixel window corresponding to a FIG. 3 first pixel window position, generating starting values of a first plurality of interpolated half-pixels, in a processing of one reduced cycle multi-tap interpolating filter according to one exemplary embodiment.

Referring to FIGS. 2 through 4 an example first "even" machine cycle will be described in greater detail. In an aspect the first "even" machine cycle can include loading the FIG. 4 pixel window register 202 to state 402, reflecting FIG. 3 window 302 position 302-0 spanning pixels A, B, C, D, E, F, G and H, and loading the tap coefficient set register 206 to state 406 which is the first tap coefficient set of [1, −5, 1, −5, 1, −5, 1, −5]. The multipliers 204 can multiply the pixel window register 202 state 402 pixels A, B, C, D, E, F, G by the tap coefficient set register 206 state 406 and generate four pair of products, and input these to respective operand ports (shown but not labeled) of a corresponding one of the summing devices 208.

In one aspect, the multiplication operations can include multiplier pair 204-0, 204-1 receiving pixels A and B from the first and second pixel register 202-0 and 202-1, multiplying these pixels A and B, respectively, by "1" and "−5" from the first tap coefficient set of [1, −5, 1, −5, 1, −5, 1, −5], then inputting the respective products, which are "A" and "−5B," to the operand ports of the first summing device 208-0. The output of the first summing device 208-0, (A−5B), thereby forms the "even" interpolated half-pixel a in the first accumulator register 210-0. The second multiplier pair 204-2, 204-3 can likewise receive pixels C and D from the third and fourth pixel register 202-2 and 202-3, respectively, multiply these by "1" and "−5" from the third and fourth tap coefficient registers 206-2 and 206-3 at state 406 and send the resulting outputs, "C" and "−5D," to the input operand ports of the second summing device 208-1. The output of the second summing device 208-0, (C−5D), can thereby form the "even" interpolated half-pixel c in the second accumulator register 210-1. Similarly, the third multiplier pair 204-4, 204-5 can receive pixels E and F from the fifth and sixth pixel register 202-4 and 202-5 multiply these by "1" and "−5" from the fifth and sixth tap coefficient registers 206-4 and 206-5 to form, through the third summing device 208-2, the "even" interpolated half-pixel e in the third accumulator register 210-2. Likewise, the fourth multiplier pair 204-6, 204-7 can receive pixels G and H from the seventh and eighth pixel register 202-6 and 202-7 multiply these by "1" and "−5" from the seventh and eighth tap coefficient registers 206-6 and 206-7 to form, through the fourth summing device 208-3, the "even" interpolated half-pixel g in the fourth accumulator register 210-3.

The content 410 of the accumulator 210 therefore, at the end of the first "even" machine cycle in this example, can have the intermediate values of the "even" interpolated half-pixels a, c, e, g shown at region 470 of FIG. 4. In an aspect, the content 410 having the described interpolated half-pixels a, c, e, g with values shown at region 470 can be offloaded to memory.

Referring now to FIGS. 3 and 5, an example process of a first "odd" machine cycle will be described. In one aspect, the FIG. 2 pixel window register 202 shifts its pixel contents one pixel to the left to encompass the pixels corresponding to the FIG. 3 second pixel window position 302-1, which is B, C, D, E, F, G, H, I. This is reflected by the FIG. 5 pixel window register state 502 and may be performed by a first-in-first-out (FIFO) operation of the last pixel register 202-7 shifting in pixel "I", and each of the pixel register 202-x, for x=0 to 6, receiving the contents of the preceding (in right-to-left order) pixel register 202-x+1. The content of the tap coefficient set register 206 remains at state 406. i.e., the first tap coefficient set of [1, −5, 1, −5, 1, −5, 1, −5]. In an aspect, multipliers 204 and summing devices 208 multiply the state 406 of the tap coefficient register 206, i.e., the first tap coefficient set of [1, −5, 1, −5, 1, −5, 1, −5] by the pixels B, C, D, E, F, G, H in the same manner as described for the first "even" cycle, to form through the summing devices 20 the following four "odd" interpolated half-pixels b, d, f, and h in the accumulator 210: (B−5C) as an initial value of interpolated half-pixel b in the first accumulator register 210-0; (D−5E) as an initial value of interpolated half-pixel d in the second accumulator register 210-1; (F−5G) as an initial value of interpolated half-pixel f in the third accumulator register 210-2; and (H−5I) as an initial value of interpolated half-pixel h in the fourth accumulator register 210-3. The content 510 of the accumulator 210, i.e., the initial values of the "odd" interpolated half-pixels b, d, f, and h is shown at region 572 of FIG. 5 and, in an aspect, can be offloaded to memory.

Figure 6:
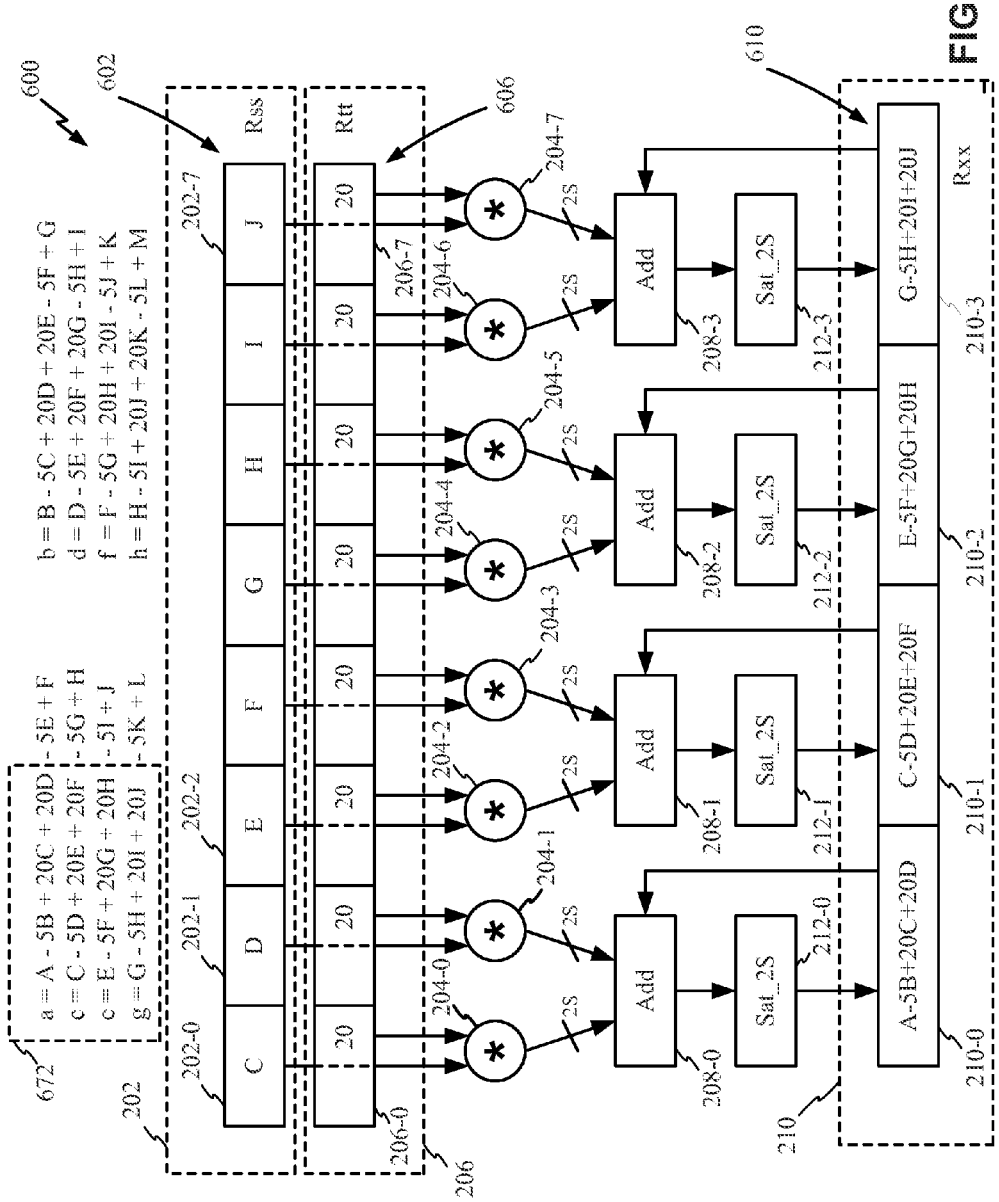
FIG. 6 shows on the FIG. 2 functional block diagram one example machine cycle, operating on a pixel window corresponding to a FIG. 3 third pixel window position, generating first accumulated or updated values of the first plurality of interpolated half-pixels, in the processing of one reduced cycle multi-tap interpolating filter according to one exemplary embodiment.

Referring now to FIGS. 3 and 6, in an example second "even" machine cycle the initial values of the four "even" interpolated half-pixels a, c, e, and g formed at the first "even" machine cycle can be incremented, essentially by repeating the operations of the first "even" machine cycle, but using the pixels in the FIG. 3 third pixel window position 302-2 and the second tap coefficient set [20, 20, 20, 20, 20, 20, 20, 20], and using the result to increment the previously four "even" interpolated half-pixels a, c, e, and g.

Referring still to FIGS. 3 and 6, in an aspect the second "even" machine cycle can include re-loading the earlier formed four "even" interpolated half-pixels a, c, e, and g into the accumulator 210, shifting the pixel window register 202, e.g., by a FIFO operation, to pixel window register state 602 having pixels C, D, E, F, G, H, I, and J, and loading the tap coefficient set register 206 with the example second tap coefficient set [20, 20, 20, 20, 20, 20, 20, 20] as reflected by state 606. The multipliers 204 can multiply the content or state 606 of the tap coefficient set register 206 [20, 20, 20, 20, 20, 20, 20, 20] by the pixels C, D, E, F, G, H, I and J in the pixel window register 202, and couple the resulting products to the summing devices 208. The summing devices 208 by receiving these multiplier 204 outputs and the FIG. 6 depicted feedback of the earlier formed four "even" interpolated half-pixels a, c, e, and g, can form in the accumulator 210 the incremented "even" half-pixels a, c, e, and g having the following values shown at region 672 of FIG. 6: incremented "even" interpolated half-pixel a equal to (A−5B+20C+20D) in the first accumulator register 210-0; incremented "even" interpolated half-pixel c equal to (C−5D+20E+20F) in the second accumulator register 210-1; incremented "even" interpolated half-pixel c equal to (E−5F+20G+20H) in the third accumulator register 210-2; and incremented "even" interpolated half-pixel g equal to (G−5H+20I+20J) in the fourth accumulator register 210-3. In an aspect, these incremented four "even" interpolated half-pixels a, c, e, and g can be offloaded to memory.

Referring now to FIGS. 3 and 7, in an example second "odd" machine cycle the initial values of the four "odd" interpolated half-pixels b, d, f, and h formed at the first "odd" machine cycle are incremented, by a result obtained by repeating the operations of the second "even" machine cycle, but using the pixels in the FIG. 3 fourth pixel window position 302-3. The tap coefficient register can remain at state 606, which is the second tap coefficient set [20, 20, 20, 20, 20, 20, 20, 20]. In an aspect, the pixel window register 202 can be shifted to encompass the pixels corresponding to the FIG. 3 fourth pixel window position 302-3, which are D, E, F, G, H, I, J, and K, as shown by FIG. 7 pixel window register state 702, and re-loading the initial values of the four "odd" interpolated half-pixels b, d, f, and h from memory into the accumulator 210. In one aspect, in an operation substantially the same as described for the second "even" machine cycle, the second "odd" machine cycle can update the accumulator 210 content to the following values of the "odd" interpolated half-pixels b, d, f, and h, also shown at region 772 of FIG. 7: incremented "odd" interpolated half-pixel b equal to (B−5C+20D+20E) in the first accumulator register 210-0; incremented "odd" interpolated half-pixel d equal to (D−5E+20F+20G) in the second accumulator register 210-1; incremented "odd" interpolated half-pixel f equal to (F−5G+20H+20I) in the third accumulator register 210-2; and incremented "even" interpolated half-pixel h equal to (H−5I+20J+20K) in the fourth accumulator register 210-3. In an aspect, these incremented four "odd" interpolated half-pixels b, d, f, and h can be offloaded to memory.

Referring now to FIGS. 3 and 8, in one aspect a third "even" machine cycle can increment the previously incremented (by the above-described second "even" machine cycle) values of the four "even" interpolated half-pixels a, c, e, and g to a final value, using a result obtained by repeating the operations of the second "even" machine cycle, but with the pixel window register 202 shifted to state 802 to encompass the pixels E, F, G, H, I, J, K, and L of the FIG. 3 fifth pixel window position 302-4 and the co-efficient register 206 loaded to state 806 which is the third tap coefficient set [−5, 1, −5, 1, −5, 1, −5, 1]. In an aspect, the previously incremented four "even" interpolated half-pixels a, c, e, and g can be loaded from memory into the accumulator 210 and, in operation substantially the same as described for the second "even" machine cycle, the third "even" machine cycle can update the accumulator 210 content to the following final values of the "even" half-pixels a, c, e, and g: "even" interpolated half-pixel a equal to (A−5B+20C+20D−5E+F) in the first accumulator register 210-0; "even" interpolated half-pixel a equal to (C−5D+20E+20F−5G+H) in the second accumulator register 210-1; "even" interpolated half-pixel a equal to (E−5F+20G+20H−5I+J) in the third accumulator register 210-2; and "even" interpolated half-pixel a equal to (G−5H+20I+20J−5K+L) in the fourth accumulator register 210-3. These values are shown at region 872 of FIG. 8.

Figure 9:
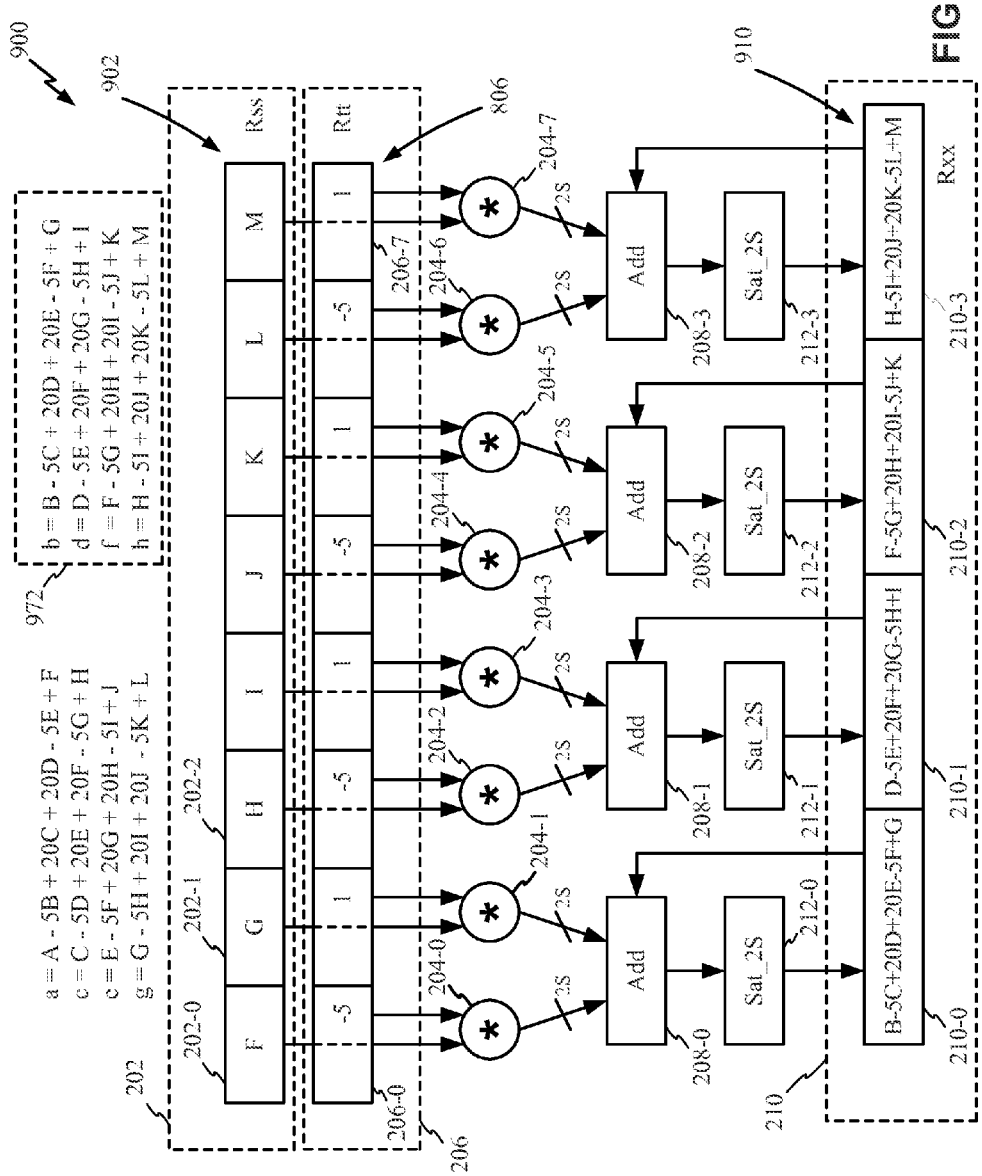
FIG. 9 shows on the FIG. 2 functional block diagram another example final machine cycle, operating on a pixel window corresponding to a FIG. 3 sixth pixel window position, generating final values of the second plurality of interpolated half-pixels, in the processing of one reduced cycle multi-tap interpolating filter according to one exemplary embodiment.

Referring now to FIGS. 3 and 9, in one aspect a third "odd" machine cycle can increment the previously incremented (by the above-described second "odd" machine cycle) values of the four "odd" interpolated half-pixels b, d, f, and h to a final value, using a result obtained by repeating the operations of the second "even" machine cycle, but with the pixel window register 202 shifted to state 902 to encompass the pixels E, F, G, H, I, J, K, L and M of the FIG. 3 sixth pixel window position 302-5, to form in the accumulator 210 final "odd" half-pixels b, d, f, and h having the following values, which are shown at region 972 of FIG. 9: "odd" interpolated half-pixel b equal to (B−5C+20D+20E−5F+G) in the first accumulator register 210-0; "odd" interpolated half-pixel d equal to (D−5E+20F+20G−5H+I) in the second accumulator register 210-1; "odd" interpolated half-pixel f equal to (F−5G+20H+20I−5J+K) in the third accumulator register 210-2; and "odd" interpolated half-pixel h equal to (H−5I+20J+20K−5L+M) in the fourth accumulator register 210-3.

It will be appreciated that the FIG. 2 multi-tap merged interpolating filter 200 performed a six-tap interpolating filter process in generating the above-described example sets of "even" and "odd" interpolated half-pixels. It will be understood that a 6-tap interpolating filter is only an example, and is not intended to limit the scope of practices and structures encompassed by, or that may be a practice of any embodiment. For example, persons of ordinary skill in the art can readily apply concepts shown in relation to the 6-tap interpolating filter to provide an 8-tap interpolating filter.

Figure 10:
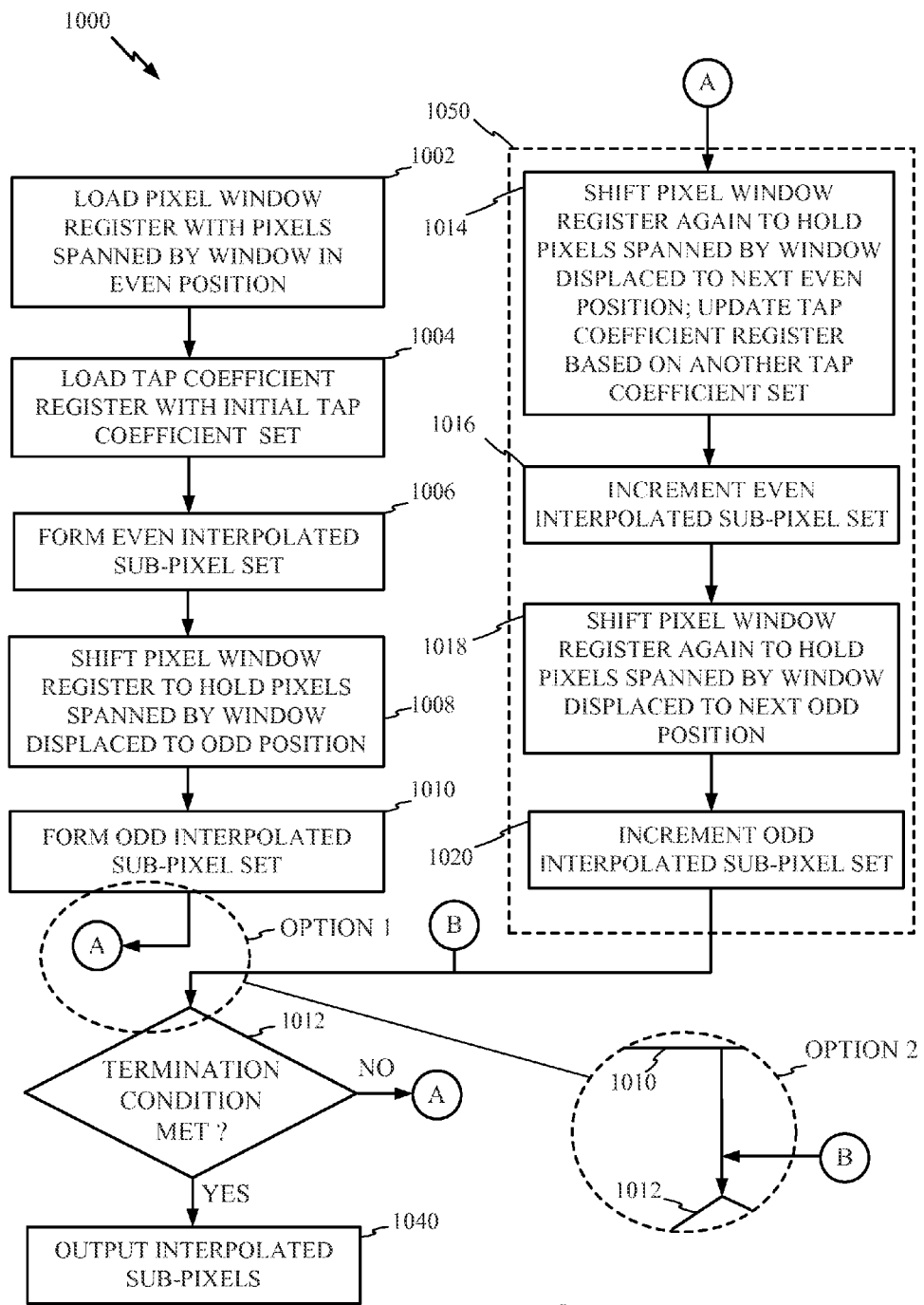
FIG. 10 shows one example logical flow for one process of reduced machine cycle sub-pixel interpolation in one or methods and systems in accordance with various exemplary embodiments.

FIG. 10 shows one example logical flow for one process 1000 of reduced machine cycle sub-pixel interpolation in one or methods and systems in accordance with various exemplary embodiments. In one example operation, the process 1000 can begin with or can include passing through 1002, and load or otherwise set a pixel window register with pixels to corresponding to an "even" position relative to an index (not shown) assigned to the pixels. For example, FIG. 3 position 302-0 can be an example of an "even" position in accordance with 1002. The process 1000 can in one example operation, at any time relative to 1002, but preferably prior to 1006, load or otherwise establish at 1004 a tap coefficient register with a tap coefficient set. Referring to FIG. 4, one example of a loading at 1004 of a tap coefficient register with a tap coefficient set, for practices in accordance with various exemplary embodiments, can be loading or setting the tap coefficient set register 206 to state 406 with, for example, the first tap coefficient set [1, −5, 1, −5, 1, −5, 1].

Referring to FIG. 10, in an aspect one example operation the process 1000 can, preferably with states corresponding to 1002 and 1004 established, go to 1006 and form a set of "even" sub-pixels by an "even" machine cycle of an interpolating multi-tap in accordance with various exemplary embodiments. One example of a 1006 forming a set of "even" sub-pixels by "even" machine cycle of an interpolating multi-tap filter tap in accordance with various exemplary embodiments can be the first "even" machine cycle described in reference to FIG. 4 for forming the "even" interpolated half-pixels a, c, e, and g.

With continuing reference to FIG. 10, in one example operation the process 1000, after the 1006 forming a set of "even" sub-pixels by "even" machine cycle of an interpolating multi-tap filter in accordance with various exemplary embodiments, can go to 1008 to shift or otherwise update content of the pixel window register with pixels to corresponding to an "odd" position relative, for example, to the index associated with the "even" position at 1002. Referring to FIG. 3, position 302-1 shows one example of an "odd" position in accordance with 1008. In an aspect, in one example operation the process 1000 can, preferably with a pixel window register state corresponding to 1008 and a tap coefficient register associated with state 1004, go to 1010 and form a set of "odd" sub-pixels by "odd" machine cycle of the interpolating multi-tap filter in accordance with one or more exemplary embodiments. One example of a 1010 forming a set of "odd" sub-pixels by "odd" machine cycle of the interpolating multi-tap filter can be the first "odd" machine cycle described in reference to FIG. 5 forming the "odd" interpolated half-pixels b, d, f and h.

Continuing to refer to FIG. 10, in an aspect having a logic flow represented as "Option 2," an example operation according to the process 1000 can, after the 1010 forming the set of "odd" interpolated half-pixels b, d, f, and h, go to the terminating condition escape block 1012 to determine whether a given terminating condition for the reduced machine cycle sub-pixel interpolation is met. In other words, in the aspect having the logic flow represented as "Option 2," the above-described forming of the four "even" interpolated half-pixels a, c, e, and g and four "odd" interpolated half-pixels b, d, f and h can comprise the entirety of the arithmetic operations, in other words can generate the final values of the complete set of eight interpolated half-pixels a, b c, d, e, f, g and h. This "Option 2" aspect can provide a two machine cycle generation of a full set final interpolated half-pixels a, b c, d, e, f, g and h, each being a sum of two products. In an operation according to this aspect the answer at this first instance of the terminating condition escape block 1012 will be "YES," and the process 100 can go to block 1014 and output the formed set of interpolated half-pixels a, b, c, d, e, f, g and h.

Continuing still with FIG. 10, in another aspect, having a logic flow represented as "Option 1," the terminating condition escape block 1012 can be configured to not enter terminating condition escape block 1012 immediately succeeding the 1010 forming the odd interpolated half-pixels and, instead, go to an accumulating 1050. As described in greater detail below, in "Option 1, { a terminating condition of the terminating condition escape block 1012 can be a number of times of repeating the accumulating 1050 of the "even" and "odd" sets of sub-pixels formed at 1006 and 1010.

In one example operation the process 1000, configured according to the "Option 1" aspect, the first instance of the accumulating 1050 can be, at 1014, shifting or otherwise updating content of the pixel window register (e.g., the FIG. 2 pixel window register 202) with pixels corresponding to another "even" position and loading or otherwise updating the tap coefficient register with another set of tap coefficients. Referring to FIG. 3, position 302-2 illustrates one example of another "even" position in accordance with 1014. Referring FIG. 4, loading or setting FIG. 4 tap coefficient set register 206 to state 606 with, for example, the second tap coefficient set [20, 20, 20, 20, 20, 20, 20, 20] show one example of the 1014 loading or otherwise updating the tap coefficient set register with another tap coefficient set. FIG. 4 pixel window register 202 state 402 also reflects the above-described FIG. 3 example position 302-2 of an "even" position at 1014.

Continuing to refer to FIG. 10, in an aspect in one example operation according to the repeated accumulating aspect, with the "even" pixel window register state and tap coefficient register state in accordance with the updating at 1014, the process 1000 can go to 1016 and increment or otherwise update the set of "even" sub-pixels either formed at 1006 or previously incremented by a preceding iteration through the loop 1014, 1016, 1018, 1020 and 1112, as described in greater detail below. In the present described example, this is the first instance of 1014 and, therefore, the incrementing will be on the set of "even" sub-pixels formed at 1006. One example of a 1016 incrementing or otherwise updating the set of "even" sub-pixels by "even" machine cycle of the interpolating multi-tap filter can be the second "even" machine cycle described in reference to FIG. 6 for incrementing the "even" interpolated half-pixels a, c, e, and g.

Referring still to FIG. 10, in one example operation of the process 1000, after the 1016 incrementing the set of "even" sub-pixels by "even" machine cycle of an interpolating multi-tap filter, can go to 1018 to shift or otherwise update content of the pixel window register with pixels to corresponding to another "odd" position relative, for example, to the index associated with the "even" positions at 1002 and 1014. For example, FIG. 3 position 302-3 can be an example of an "odd" position in accordance with 1018. According to one aspect, in an example operation the process 1000 can, with "odd" pixel window register state corresponding to 1018 and the same tap coefficient register state used in the "even" updating at 1016, go to 1020 and increment or otherwise update the set of "odd" sub-pixels. Assuming this to be the first instance of the incrementing or updating at 1020 the basis "odd" sub-pixels can be the set formed at 1010. It will be understood that in a next repeat of the accumulating 150 the basis "odd" sub-pixels will be the set previously incremented by a preceding iteration through the accumulating, i.e., through 1014, 1016, 1018, 1020, formed as a loop by the terminating condition escape block 1012. One example of a 1020 incrementing or otherwise updating the set of "odd" interpolated sub-pixels by "odd" machine cycle of the interpolating multi-tap filter can be the second "odd" machine cycle described in reference to FIG. 7 for incrementing the "odd" interpolated half-pixels b, d, f and h.

Continuing to refer to FIG. 10, in one example operation the process 1000, after the 1020 incrementing the set of "odd" sub-pixels by "odd" machine cycle of an interpolating multi-tap filter, can go to terminating condition escape block 1040 to determine if the given terminating condition, which for this aspect is a given number of times repeating the accumulating 1050. One such example, described in greater detail below in reference FIGS. 8 and 9 together with FIG. 10, is performing the example second and final incrementing of the "even" interpolated half-pixels a, c, e, and g which, in the example, is by the FIG. 8 second "even" machine cycle, and performing the example second and final incrementing of the "odd" interpolated half-pixels b, d, f, and h which, in the example, is by the FIG. 9 second "odd" machine cycle.

Referring still to FIG. 10, it will be assumed for this example that the given terminating condition is more than one repeat of the accumulating 1050 and, therefore, the answer at terminating condition escape block 1012 is "NO." The process 1000 therefore returns to the accumulating 1050. The loop of 1014, 1016, 1018, 1020, 1012 continues until the terminating condition at the terminating condition escape block 1012 is met. Referring to the examples described in reference to FIGS. 8 and 9, these show one example an iteration of the accumulating 1050 loop of 1014, 1016, 1018 and 1020. When the terminating condition at the terminating condition escape block 1012 is met, the accumulating 1050 of the sub-pixels is complete and the process 1000 can go to 1014 and output the final interpolated sub-pixels. Referring to FIGS. 8 and 9, one example outputting 1014 of the final interpolated sub-pixels is the described generation of the final values for the sub-pixels a, b, c, d, e, f, g and h.

Figure 11:
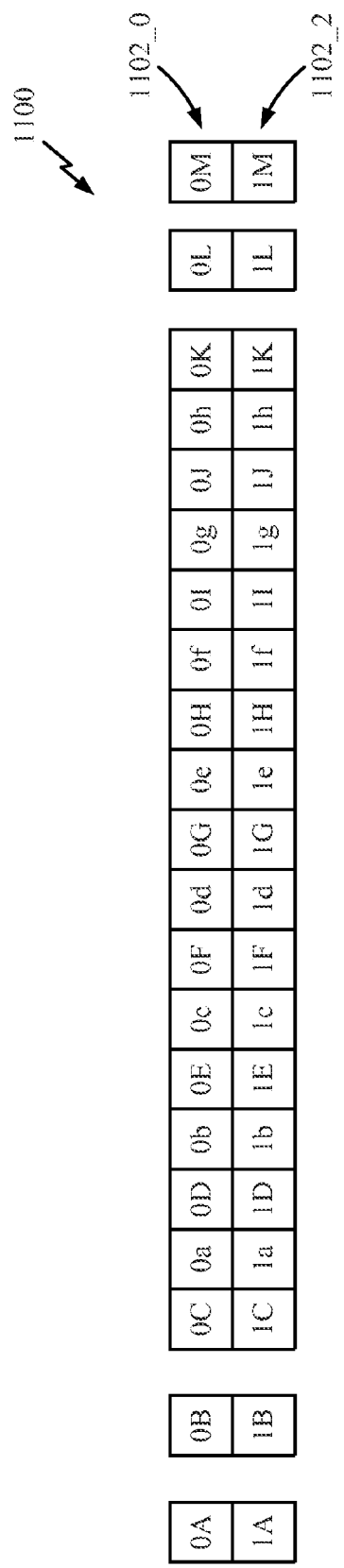
FIG. 11 shows two example pixel row sections and corresponding example half-pixels generated in processes on a reduced cycle multi-tap interpolating filter according to one or more exemplary embodiments.

FIG. 11 shows, as one example input 1100 that can be processed in a reduced cycle multi-tap interpolating filter apparatus and filter method according to one exemplary embodiment two pixel row sections, 1102_0 and 1102_1. Pixel row section 1102_0 is shown having "whole" pixels 0A, 0B, 0C, 0D, 0E, 0F, 0G, 0H, 0I, 0J, 0K, 0L, and 0M (collectively "pixels 0A-0M") and pixel row section pixel row 102_1 is shown having "whole" pixels 1A, 1B, 1C, 1D, 1E, 1F, 1G, 1H, 1I, 1J, 1K, 1L and 1M collectively "pixels 1A-1M"). In describing an example process in accordance with the exemplary embodiments it will be assumed that pixels 0A-0A and 1A-1M have given values, for example but not limited to outputs, or filtered outputs of a optical detector (not shown). It will be understood, though, that the term "row" within the phrase "pixel row sections" does not necessarily mean pixels must be from a "row" of a row-by-column video array. For example pixel row sections 1102_0 and 1102_1 may be from adjacent or otherwise spaced "columns," (not shown) of array, adjacent diagonals (not shown) or from other respective regions of an array.

With continuing reference to FIG. 11, pixel row section 1102_0 is also shown having half-pixel locations 0a, 0b, 0c, 0d, 0e, 0f, 0g and 0h (collectively "half-pixels 0a-0h") and, similarly, pixel row section 1102_1 is shown having half-pixel locations 1a, 1b, 1c, 1d, 1e, 1f, 1g and 1h (collectively "half-pixels 1a-1h").

Referring to Appendix A, pseudo-code Section A1 shows example computer-executable instructions for a reduced cycle multi-tap interpolating filter apparatus and filter method according to one exemplary embodiment, and its operation in generating half-pixels 0a-0h and half-pixels 1a-1h in accordance with one of more exemplary embodiments, using example pixel row 102_0 pixels 0A-0M and pixel row 102_1 pixels 1A-1M.

Figure 12:
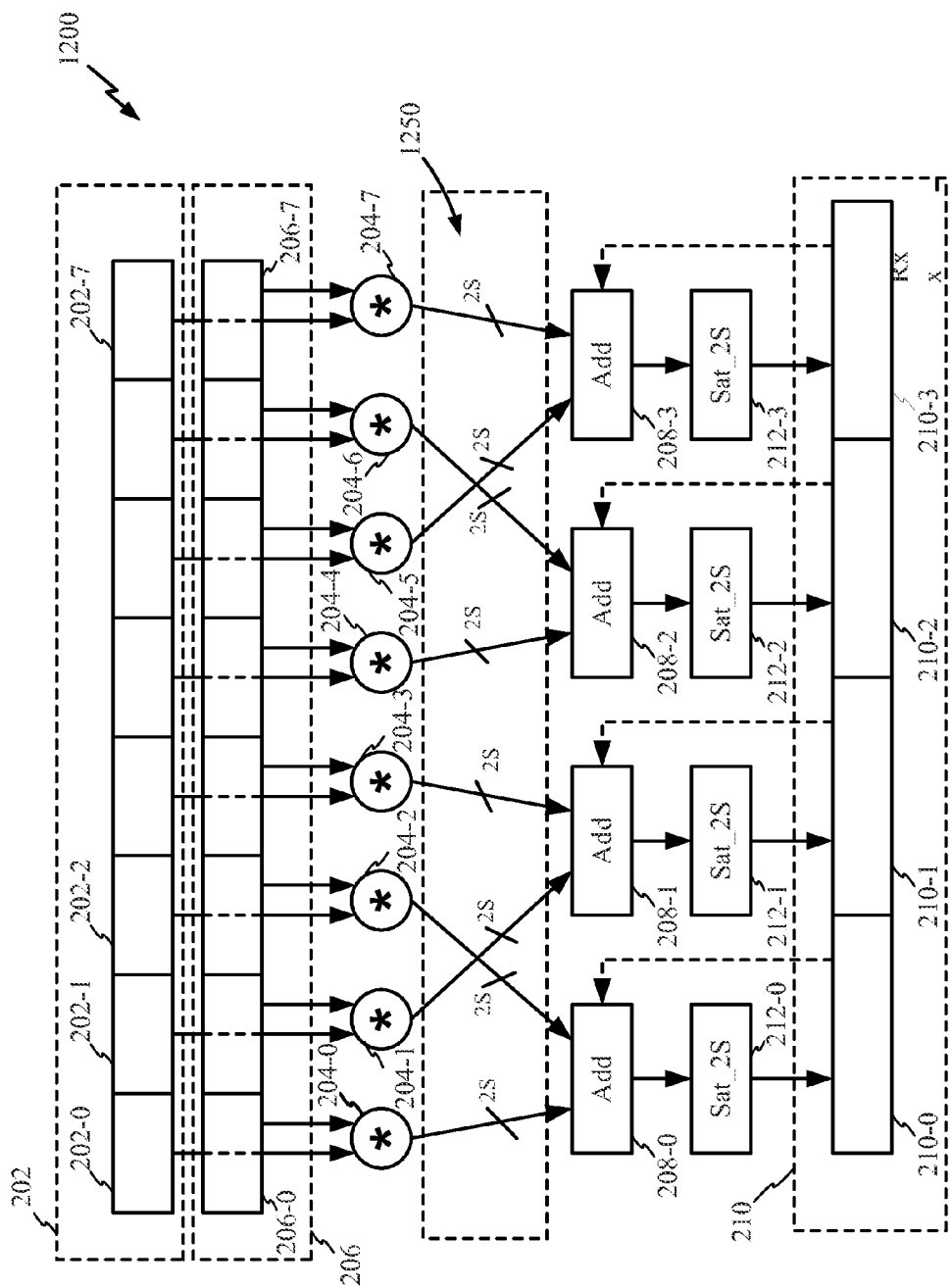
FIG. 12 shows one functional block diagram of one bilinear interpolation filter, in an aspect providing interleaved chroma component, in one example implementation using one configuration of the FIG. 2 reduced cycle multi-tap interpolating filter 200, according to one exemplary embodiment.

FIG. 12 shows one bilinear interpolation of interleaved chroma component configuration 1200 of the FIG. 2 reduced cycle multi-tap interpolating filter 200 according to one exemplary embodiment. Referring to FIG. 12, in an aspect the interleaved chroma component configuration 1200 can multiply eight 8-bit signed bytes in the Rss register 202 by the corresponding 8-bit unsigned bytes in the Rtt register 206, and configures the summing devices 208-0, 208-1, 208-2, and 208-3 in a manner that adds the multiplication results in cross pairs as shown by the directed arrows from the multipliers 204 to the summing devices 208. Comparing FIGS. 2 and 12 it will be appreciated that their respective routing or coupling of the multiplication results from multipliers 204 to the summing devices 208 are in accordance with their different described operations. With respect to techniques for switching, routing or coupling logic (not shown) for changing modes of the couplings of the multipliers 204 to the summing devices 208 between FIGS. 2 and 12, in one aspect persons of ordinary skill in the art can, based on the present disclosure, select or otherwise implement such logic by applying conventional digital signal processor design techniques and, therefore, further detailed description is omitted.

Figure 13:
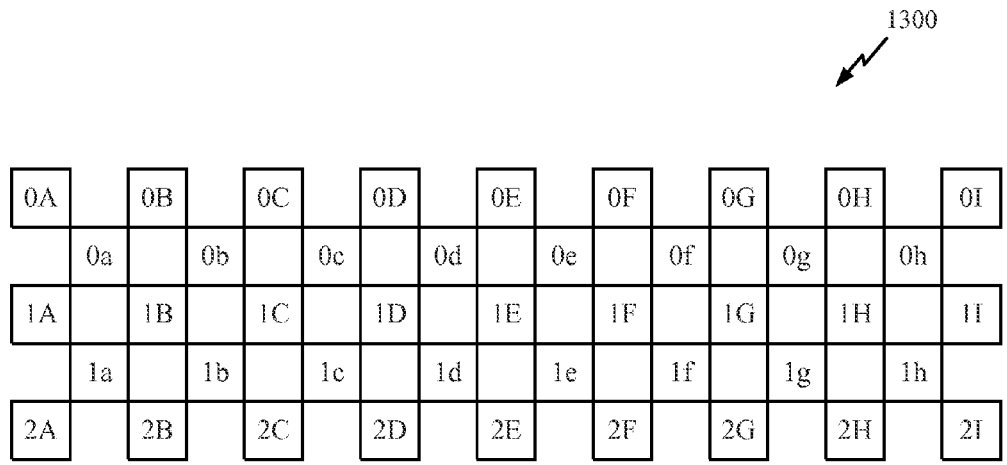
FIG. 13 shows one example array of pixels that can be involved in a bilinear interpolation of an interleaved chroma component.

FIG. 13 shows one example array 1300 of pixels that can be involved in a bilinear interpolation of a planar chroma component in accordance with one exemplary embodiment.

Figure 14:
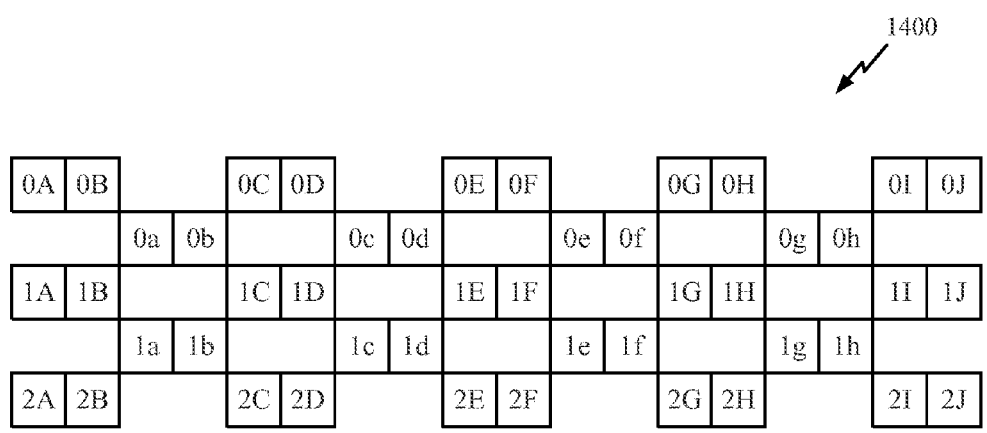
FIG. 14 shows one example generated bilinear interpolated interleaved chroma component in a process according to one exemplary embodiment.

FIG. 14 shows an example array 1400 of pixels having one-quarter pixels generated in a bilinear interpolation of a planar chroma component, based on the FIG. 13 example array 1300.

Referring to Appendix A, pseudo-code Section A2 shows example, referring to FIGS. 13 and 14, of computer-executable instructions for generating one-quarter pixels in a bilinear interpolation of a planar chroma component in an apparatus and method according to one of more exemplary embodiments.

Figure 15:
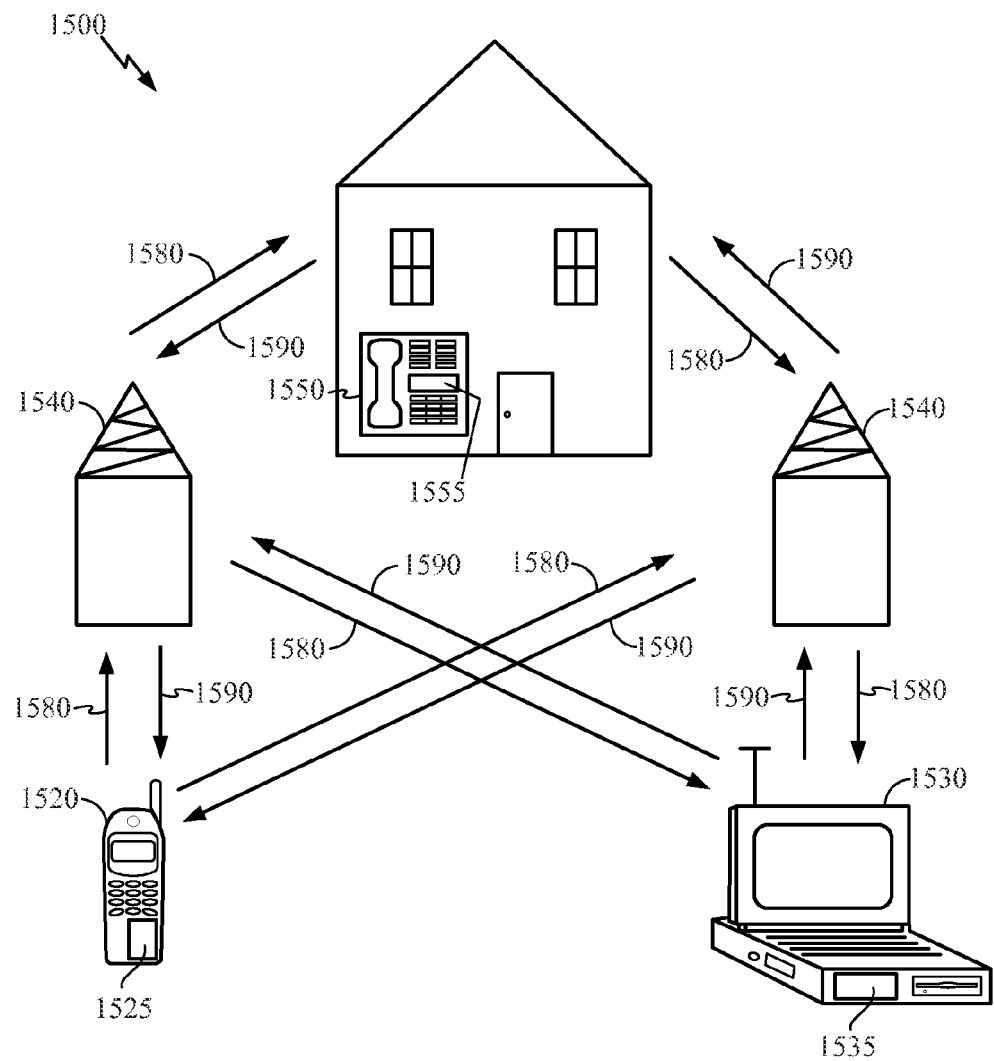
FIG. 15 shows a functional block diagram of example personal computing devices according to one or more exemplary embodiments.

FIG. 15 illustrates an exemplary wireless communication system 1500 in which one or more embodiments of the disclosure may be advantageously employed. For purposes of illustration, the exemplary wireless communication system 1500 shows three remote units 1520, 1530, and 1550 and two base stations 1540. It will be recognized that conventional wireless communication systems may have many more remote units and base stations. The remote units 1520, 1530, and 1550 can include semiconductor devices 1525, 1535 and 1555, and one or more of the semiconductor devices 1525, 1535 and 1555 can include one or more reduced cycle multi-tap interpolating filters in accordance with various exemplary embodiments, for example, without limitation, the reduced cycle multi-tap interpolating filter described in reference to FIG. 2, configurable to perform sub-pixel interpolation as described in reference to FIGS. 3 through 10 and, in one aspect, configurable as described in reference to FIG. 11 to perform bilinear interpolation such as described in reference to FIGS. 12 and 13. FIG. 15 shows forward link signals 1580 from the base stations 1540 and from the remote units 1520, 1530, and 1550 and reverse link signals 1590 from the remote units 1520, 1530, and 1550 to the base stations 1540.

Referring to FIG. 15, the remote unit 1520 is shown as a mobile telephone, the remote unit 1530 is shown as a portable computer, and the remote unit 1550 is shown as a fixed location remote unit in a wireless local loop system. It will be understood that these are only examples of devices that may implement any of the remote units 1520, 1530 and 1550. For example, the remote units 1520, 1530 and 1550 may be one or more of a mobile phone, hand-held personal communication systems (PCS) unit, portable data units such as a personal data assistant, navigation devices (such as GPS enabled devices), set top box, music player, video player, entertainment unit, fixed location data unit such as a meter reading equipment, or any other device that stores or retrieves data or computer instructions, or any combination thereof. Although FIG. 15 illustrates remote units according to the teachings of the disclosure, the disclosure is not limited to these exemplary illustrated units. Embodiments of the disclosure may be suitably employed in any device which includes at least one semiconductor die having active integrated circuitry including memory and on-chip circuitry for test and characterization.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory. EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for phase sampling a received serial bit stream as according to methods of described embodiments. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

APPENDIX A

| 0A | 0B | 0C | 0a | 0D | 0b | 0E | 0c | 0F | 0d | 0G | 0e | 0H | 0f | 0I | 0g | 0J | 0h | 0K | 0L | 0M |
|----|----|----|----|----|----|----|----|----|----|----|----|----|----|----|----|----|----|----|----|----|
| 1A | 1B | 1C | 1a | 1D | 1b | 1E | 1c | 1F | 1d | 1G | 1e | 1H | 1f | 1I | 1g | 1J | 1h | 1K | 1L | 1M |

FIG. 12

Pseudo-Code Section A1.
Comments:
These computer executable instructions, when executed, generate the above FIG. 11 half-pixels 0a, 0b, 0c, 0c, 0d, 0e, 0f, 0g and 0h, and half-pixels 11a, 1b, 1c, 1d, 1e, 1f, 1g and 1h.
It will be understood that:
R1:0 is a co-efficient set corresponding to FIG. 4 state 406;
R3:2 is a co-efficient set corresponding to FIG. 6 state 602;
R5:4 is a co-efficient set corresponding to FIG. 8 state 802;
R7:6 is an initial state of a pixel window register, corresponding to FIG. 4 state 402, for the 0H – 0A pixels;
R9:8 is an initial state of a pixel window register, corresponding to FIG. 4 state 402, for the 1H – 1A pixels; and
the operation "MEMB_FIFO()" represents a shifting of the pixel window register, i.e., the operations represented by the state sequence of FIG. 4 state 402, FIG. 5 state 502, FIG. 6 state 602 ... FIG. 9 state 902.

Code:

```
//R1:0 = c1|c0|c1|c0|c1|c0|c1|c0=-5|1|-5|1|-5|1|-5|1
//R3:2 = c3|c2|c3|c2|c3|c2|c3|c2=20|20|20|20|20|20|20|20
//R5:4 = c5|c4|c5|c4|c5|c4|c5|c4=1|-5|1|-5|1|-5|1|-5
//R7:6 = 0H|0G|0F|0E|0D|0C|0B|0A
//R9:8 = 1H|1G|1F|1E|1D|1C|1B|1A
{
      R11:10 = VDMPYBSU(R1:0,R7:6):SAT   //[0g|0e|0c|0a ]
                                         //[a=A-5B      ]
                                         //[c=C-5D      ]
                                         //[e=E-5F      ]
                                         //[g=G-5H      ]

R7:6 = MEMB_FIFO()  //[0I|0H|0G|0F|0E|0D|0C|0B    ]

R15:14 = VDMPYBSU(R1:0,R9:8):SAT  //[1g|1e|1c|1a ]
                                        //[a=A-5B       ]
                                        //[c=C-5D       ]
                                        //[e=E-5F       ]
                                        //[g=G-5H       ]
      R9:8 = MEMB_FIFO()
      //[1I|1H|1G|1F|1E|1D|1C|1B         ]
}
{
      R13:12 += VDMPYBSU(R1:0,R7:6):SAT //[0h|0f|0d|0b ]
                                        //[b=B-5C       ]
                                        //[d=D-5E       ]
```

```
                                       //[f=F-5G        ]
                                       //[h=H-5I        ]

R7:6   = MEMB_FIFO()           //[0J|0I|0H|0G|0F|0E|0D|0C ]

R17:16 += VDMPYBSU(R1:0,R9:8):SAT  //[1h|1f|1d|1b ]
                                       //[b=B-5C         ]
                                       //[d=D-5E         ]
                                       //[f=F-5G         ]
                                       //[h=H-5I         ]

R9:8 = MEMB_FIFO() //[1J|1I|1H|1G|1F|1E|1D|1C   ]
}
{
    R11:10 += VDMPYBSU(R1:0,R7:6):SAT //[0g|0e|0c|0a ]
                                      //[a=A-5B+20C+20D ]
                                      //[c=C-5D+20E+20F ]
                                      //[e=E-5F+20G+20H ]
                                      //[g=G-5H+20I+20J ]

R7:6 = MEMB_FIFO() //[0K|0J|0I|0H|0G|0F|0E|0D ]

R15:14 += VDMPYBSU(R1:0,R9:8):SAT  //[1g|1e|1c|1a ]
                                       //[a=A-5B+20C+20D ]
                                       //[c=C-5D+20E+20F ]
                                       //[e=E-5F+20G+20H ]
                                       //[g=G-5H+20I+20J ]

R9:8 = MEMB_FIFO() //[1K|1J|1I|1H|1G|1F|1E|1D ]
}
{
    R13:12 += VDMPYBSU(R1:0,R7:6):SAT //[0h|0f|0d|0b ]
                                      //[b=B-5C+20D+20E]
                                      //[d=D-5E+20F+20G]
                                      //[f=F-5G+20H+20I]
                                      //[h=H-5I+20J+20K]

R7:6 = MEMB_FIFO() //[0L|0K|0J|0I|0H|0G|0F|0E ]

R17:16 += VDMPYBSU(R1:0,R9:8):SAT //[1h|1f|1d|1b ]
                                      //[b=B-5C+20D+20E]
                                      //[d=D-5E+20F+20G]
                                      //[f=F-5G+20H+20I]
                                      //[h=H-5I+20J+20K]

R9:8 = MEMB_FIFO() //[1L|1K|1J|1I|1H|1G|1F|1E ]
}
{
    R11:10 += VDMPYBSU(R1:0,R7:6):SAT //[0g|0e|0c|0a ]
                                      //[a=A-5B+20C+20D-5E+F]
                                      //[c=C-5D+20E+20F-5G+H]
                                      //[e=E-5F+20G+20H-5I+J]
                                      //[g=G-5H+20I+20J-5K+L]

R7:6 = MEMB_FIFO()//[0M|0L|0K|0J|0I|0H|0G|0F    ]
```

```
        R15:14 += VDMPYBSU(R1:0,R9:8):SAT   //[1g|1e|1c|1a ]
                                            //[a=A-5B+20C+20D-5E+F]
                                            //[c=C-5D+20E+20F-5G+H]
                                            //[e=E-5F+20G+20H-5I+J]
                                            //[g=G-5H+20I+20J-5K+L]

R9:8 = MEMB_FIFO()    //[1M|1L|1K|1J|1I|1H|1G|1F   ]
}
{
        R13:12 += VDMPYBSU(R1:0,R7:6):SAT   //[0h|0f|0d|0b ]
                                            //[b=B-5C+20D+20E-5F+G ]
                                            //[d=D-5E+20F+20G-5H+I ]
                                            //[f=F-5G+20H+20I-5J+K ]
                                            //[h=H-5I+20J+20K-5L+M ]

R17:16 += VDMPYBSU(R1:0,R9:8):SAT   //[1h|1f|1d|1b ]
                                            //[b=B-5C+20D+20E-5F+G ]
                                            //[d=D-5E+20F+20G-5H+I ]
                                            //[f=F-5G+20H+20I-5J+K ]
                                            //[h=H-5I+20J+20K-5L+M ]
}
{
        R11:10 = PACKHL(R12,R10)            //[0d|0c|0b|0a ]

R13:12 = PACKHL(R13,R11)            //[0h|0g|0f|0e ]

R15:14 = PACKHL(R16,R14)            //[1d|1c|1b|1a ]

R17:16 = PACKHL(R17,R15)            //[1h|1g|1f|1e ]
}
{
        R10 = VASRHUB(R11:10,#5):RND:SAT    //[0d|0c|0b|0a ]

R11 = VASRHUB(R13:12,#5):RND:SAT    //[0h|0g|0f|0e ]
}
{
        R14 = VASRHUB(R15:14,#5):RND:SAT    //[1d|1c|1b|1a ]

R15 = VASRHUB(R17:16,#5):RND:SAT    //[1h|1g|1f|1e ]
}
{
        MEMD() = R11:10       //[store                                   ]
                              //[0h|0g|0f|0e|0d|0c|0b|0a     ]

MEMD() = R15:14       //[store                                   ]
                              //[1h|1g|1f|1e|1d|1c|1b|1a     ]
```

Pseudo-Code Section A2

| 0A | 0B | 0C | 0D | 0E | 0F | 0G | 0H | 0I |
|----|----|----|----|----|----|----|----|----|
| 0a | 0b | 0c | 0d | 0e | 0f | 0g | 0h |    |
| 1A | 1B | 1C | 1D | 1E | 1F | 1G | 1H | 1I |
| 1a | 1b | 1c | 1d | 1e | 1f | 1g | 1h |    |
| 2A | 2B | 2C | 2D | 2E | 2F | 2G | 2H | 2I |

FIG. 13

```
//R1:0 = c1|c0|c1|c0|c1|c0|c1|c0
//R3:2 = c3|c2|c3|c2|c3|c2|c3|c2
//R5:4 = 0g|0e|0c|0a
//       0a = c0*0A+c1*0B
//       0c = c0*0C+c1*0D
//       0e = c0*0E+c1*0F
//       0g = c0*0G+c1*0H
//R7:6 = 0h|0f|0d|0b
//       0b = c0*0B+c1*0C
//       0d = c0*0D+c1*0E
//       0f = c0*0F+c1*0G
//       0h = c0*0H+c1*0I
//R9:8 = 1H|1G|1F|1E|1D|1C|1B|1A
{
    R5:4 += VDMPYBSU(R3:2,R9:8):SAT      //[0g|0e|0c|0a]

//[0a=c0*0A+c1*0B+c2*1A+c3*1B ]

//[0c=c0*0C+c1*0D+c2*1C+c3*1D ]

//[0e=c0*0E+c1*0F+c2*1E+c3*1F ]

//[0g=c0*0G+c1*0H+c2*1G+c3*1H ]

R11:10 = VDMPYBSU(R1:0,R9:8):SAT //[1g|1e|1c|1a]
                                     //[1a=c0*1A+c1*1B]
                                     //[1c=c0*1C+c1*1D]
                                     //[1e=c0*1E+c1*1F]
                                     //[1g=c0*1G+c1*1H]

R9:8 = MEMB_FIFO()       //[0I|0H|0G|0F|0E|0D|0C|0B]
}
{
    R7:6 += VDMPYBSU(R3:2,R9:8):SAT //[0h|0f|0d|0b]

//[0b=c0*0B+c1*0C+c2*1B+c3*1C ]

//[0d=c0*0D+c1*0E+c2*1D+c3*1E ]

//[0f=c0*0F+c1*0G+c2*1F+c3*1G ]

//[0h=c0*0H+c1*0I+c2*1H+c3*1I ]

R13:12 = VDMPYBSU(R1:0,R9:8):SAT  //[1h|1f|1d|1b ]
                                      //[1b=c0*1B+c1*1C]
```

```
                                            //[1d=c0*1D+c1*1E]
                                            //[1f=c0*1F+c1*1G]
                                            //[1h=c0*1H+c1*1I]
}
{
    R15:14 = VASRH(R5:4,#6):RND
    //[??|0g|??|0e|??|0c|??|0a         ]
    R17:16 = VASRH(R7:6,#6):RND
    //[??|0h|??|0f|??|0d|??|0b         ]
}
{

R19:18 = SHUFFEB(R17:16,R15:14)
    //[0h|0g|0f|0e|0d|0c|0b|0a         ]
}
{
    MEMD() = R19:18                  //[store  ]
}

//[0h|0g|0f|0e|0d|0c|0b|0a]
}
```

| 0A | 0B |    | 0C | 0D |    | 0E | 0F |    | 0G | 0H |    | 0I | 0J |
|----|----|----|----|----|----|----|----|----|----|----|----|----|----|
|    |    | 0a | 0b |    | 0c | 0d |    | 0e | 0f |    | 0g | 0h |    |
| 1A | 1B |    | 1C | 1D |    | 1E | 1F |    | 1G | 1H |    | 1I | 1J |
|    |    | 1a | 1b |    | 1c | 1d |    | 1e | 1f |    | 1g | 1h |    |
| 2A | 2B |    | 2C | 2D |    | 2E | 2F |    | 2G | 2H |    | 2I | 2J |

FIG. 14

```
//R1:0 = c1|c1|c0|c0|c1|c1|c0|c0
//R3:2 = c3|c3|c2|c2|c3|c3|c2|c2
//R5:4 = 0f|0e|0b|0a
//        0a = c0*0A+c1*0C
//        0b = c0*0B+c1*0D
//        0e = c0*0E+c1*0G
//        0f = c0*0F+c1*0H
//R7:6 = 0h|0g|0d|0c
//        0c = c0*0C+c1*0E
//        0d = c0*0D+c1*0F
//        0g = c0*0G+c1*0I
//        0h = c0*0H+c1*0J
//R9:8 = 1H|1G|1F|1E|1D|1C|1B|1A
{
    R5:4 += VXDMPYBSU(R3:2,R9:8):SAT   //[0f|0e|0b|0a ]

//[0a=c0*0A+c1*0C+c2*1A+c3*1C ]

//[0b=c0*0B+c1*0D+c2*1B+c3*1D ]

//[0e=c0*0E+c1*0G+c2*1E+c3*1G ]

//[0f=c0*0F+c1*0H+c2*1F+c3*1H ]

R11:10 = VXDMPYBSU(R1:0,R9:8):SAT  //[1f|1e|1b|1a]
                                       //[1a=c0*1A+c1*1C]
```

```
                                            //[1b=c0*1B+c1*1D]
                                            //[1e=c0*1E+c1*1G]
                                            //[1f=c0*1F+c1*1H]
        R9:8 = MEMH_FIFO()
        //[1J|1I|1H|1G|1F|1E|1D|1C        ]
    }
    {

R7:6 += VXDMPYBSU(R3:2,R9:8):SAT    //[0h|0g|0d|0c  ]

//[0c=c0*0C+c1*0E+c2*1C+c3*1E ]

//[0d=c0*0D+c1*0F+c2*1D+c3*1F ]

//[0g=c0*0G+c1*0I+c2*1G+c3*1I ]

//[0h=c0*0H+c1*0J+c2*1H+c3*1J ]
        R13:12 = VXDMPYBSU(R1:0,R9:8):SAT   //[1h|1g|1d|1c ]
                                            //[1c=c0*1C+c1*1E]
                                            //[1d=c0*1D+c1*1F]
                                            //[1g=c0*1G+c1*1I]
                                            //[1h=c0*1H+c1*1J]
    }
    {
        R14 = VASRHUB(R5:4,#6):RND:SAT //[0f|0e|0b|0a  ]
        R15 = VASRHUB(R7:6,#6):RND:SAT //[0h|0g|0d|0c  ]
    }
    {
        R17:16 = PACKHL(R15,R14)
        //[0h|0g|0f|0e|0d|0c|0b|0a                  ]
    }
    {
        MEMD() = R17:16       //[store                         ]
                    //[0h|0g|0f|0e|0d|0c|0b|0a               ]
    }
```

What is claimed is:

1. A method for generating interpolated pixels for a pixel array, comprising:
   loading a window register of a processor with a pixel window of the pixel array;
   loading a tap coefficient register of the processor with a coefficient set;
   generating initial values for a set of even interpolated sub-pixels, based on the processor multiplying the pixel window in the window register and the tap coefficient set in the tap coefficient register;
   shifting, by the processor, of the pixel window along a direction of the array, to a shifted pixel window, by updating the window register with another of the pixels of the pixel array;
   generating initial values for a set of odd interpolated sub-pixels, based on the processor multiplying said shifted pixel window in the window register by said tap efficient set in the tap coefficient register; and
   until a termination condition is met, incrementing, by the processor, the values of the even interpolated sub-pixels and the values of the odd interpolated sub-pixels wherein each incrementing comprises:
      updating the tap coefficient set in the tap coefficient register of the processor to another tap coefficient set,
      shifting, by the processor, the pixel window along said direction, to another shifted pixel window, by updating the window register with another of the pixels of the pixel array,
      incrementing, by the processor, the respective values of the even interpolated sub-pixels by an increment based on the processor multiplying the pixel window in the window register by the another tap coefficient set in the tap coefficient register,
      another shifting, by the processor, the pixel window along said direction, to another shifted pixel window, by again updating the window register with another of the pixels of the pixel array, and
      incrementing, by the processor, the respective values of the odd interpolated sub-pixels by an increment based on the processor multiplying the another shifted pixel window in the window register by said another tap coefficient set in the tap coefficient register; and
   upon the processor determining the termination condition being met, outputting the set of even interpolated sub-pixels and the set of odd interpolated sub-pixels.

2. The method of claim 1, wherein the processor generating the initial values for the set of even interpolated sub-pixels generates the initial value of at least one of the even interpolated sub-pixels as a sum of products generated by the processor, wherein each incrementing of the value of at least one even interpolated pixel increments the value by sums of products generated by the processor, and wherein the termination condition corresponds to at least one of the even interpolated pixels having a sum of six products.

3. The method of claim 1, wherein the generating initial values for the set of even interpolated sub-pixels takes place during a single machine cycle of the processor, and wherein the generating initial values for the set of odd interpolated sub-pixels takes place during a single machine cycle of the processor.

4. The method of claim 3, wherein the set of even interpolated sub-pixels includes four even interpolated sub-pixels and the set of odd interpolated sub-pixels includes four odd interpolated sub-pixels,
   wherein the initial value of each of the four even interpolated sub-pixels is generated as a sum of a corresponding two products output by a multiple processor, each of the two products being a product of a pixel from the pixel window in the window register and a tap coefficient from the set of tap coefficients in the tap coefficient register,
   wherein the initial value of each of the four odd interpolated sub-pixels is generated as a sum of a corresponding two products output by the multiplier array, each of the two products being a product of a pixel from the shifted pixel window in the window register and a tap coefficient from the set of tap coefficients in the tap coefficient register.

5. The method of claim 4,
   wherein each incrementing the respective values of the four even interpolated sub-pixels includes incrementing each of the values with a sum of another corresponding two products output by the multiplier array, each of the two products being a product of a pixel from the pixel window shifted by said shifting and stored in the window register and a coefficient from the another set of coefficients in the tap coefficient register, and
   wherein each incrementing the respective values of the four odd interpolated sub-pixels includes incrementing each of the values with a sum of another corresponding two products output by the multiplier array, each of the two products being a product of a pixel from the pixel window shifted by said another shifting and stored in the window register and a coefficient from said another set of coefficients in the coefficient register.

6. The method of claim 5, wherein updating the set of tap coefficients in the tap coefficient register and shifting the pixel window in the window register, combined with incrementing the respective values of the even interpolated sub-pixels, take place during a single machine cycle of the processor, and wherein the another shifting the pixel window in the window register to an again updated shifted pixel window combined with incrementing the respective values of the odd interpolated sub-pixels take place during a single machine cycle of the processor.

7. The method of claim 1, wherein the termination condition is met upon the processor twice incrementing the values of the even interpolated sub-pixels and the values of the odd interpolated sub-pixels.

8. The method of claim 1,
   wherein generating the initial values of the even interpolated sub-pixels comprises a multiplying, on a multiplier array of the processor, pixels from the pixel window in the window register by corresponding tap coefficients from the tap coefficient set in the tap coefficient register to generate corresponding products, the processor summing pairs of said corresponding products to generate a set of sum-of-products, loading the set of sum-of-products into an accumulator register of the processor as the initial values of the set of even interpolated sub-pixels, and offloading the initial values of the set of even interpolated sub-pixels from the accumulator register to a memory coupled to the processor, and
   wherein generating the initial values of the odd interpolated sub-pixels comprises multiplying, by the array of multipliers, pixels from the shifted pixel window in the window register by corresponding tap coefficients from the tap coefficient set in the tap coefficient register to generate corresponding products, the processor summing pairs of said corresponding products to generate another set of sum-of-products, loading the another set of sum-of-products into the accumulator register as the initial values of the set of odd interpolated sub-pixels, and offloading the initial values of the set of odd interpolated sub-pixels from the accumulator register to the memory.

9. The method of claim 8, wherein generating the initial values of the set of even interpolated sub-pixels takes place during a single machine cycle of the processor, and wherein generating the initial values of the set odd interpolated sub-pixels takes place during a single machine cycle of the processor.

10. The method of claim 8,
wherein each incrementing the values of the even interpolated sub-pixels includes loading the set of even interpolated sub-pixels from the memory of the processor into the accumulator register, multiplying, by the multiplier array, pixels from the shifted pixel window in the window register by corresponding tap coefficients from the another tap coefficient set in the tap coefficient register to generate corresponding products, summing pairs of said products with corresponding even interpolated sub-pixels loaded in the accumulator register to generate a set of accumulated even interpolated sub-pixels, and loading the set of accumulated even interpolated sub-pixels into the accumulator register as updated values of the set of even interpolated sub-pixels, and offloading the set of even interpolated sub-pixels from the accumulator register to the memory of the processor, and
wherein each incrementing the values of the odd interpolated sub-pixels includes loading the set of odd interpolated sub-pixels from the memory into the accumulator register, multiplying, by the multiplier array, pixels from the another shifted pixel window in the window register by corresponding tap coefficients from the another tap coefficient set in the tap coefficient register to generate corresponding products, summing pairs of said products with corresponding odd interpolated sub-pixels loaded in the accumulator register to generate a set of accumulated odd interpolated sub-pixels, and loading the set of accumulated odd interpolated sub-pixels into the accumulator register as updated values of the set of odd interpolated sub-pixels, and offloading the set of odd interpolated sub-pixels from the accumulator register to the memory.

11. The method of claim 10, wherein incrementing the values of the set of even interpolated sub-pixels takes place during a single machine cycle of the processor, and wherein incrementing the values of the set of odd interpolated sub-pixels takes place during a single machine cycle of the processor.

12. A computer-readable non-transitory medium comprising instructions, which, when executed by a processor apparatus in a wireless communications system, cause the processor apparatus to perform operations carrying out a method for generating interpolated pixels for a pixel array, comprising instructions that cause the processor apparatus to:
load a window register with a pixel window of the pixel array;
load a tap coefficient register with a tap coefficient set;
generate initial values for a set of even interpolated sub-pixels, based on the pixel window in the window register and the tap coefficient set in the tap coefficient register;
shift the pixel window along a direction of the array, by updating the window register with another of the pixels of the pixel array;
generate initial values for a set of odd interpolated sub-pixels, based on said shifted pixel window in the window register and said tap efficient set in the tap coefficient register; and until a given termination condition is met, increment the values of the even interpolated sub-pixels and the values of the odd interpolated sub-pixels wherein the instruction causes the processor apparatus to increment the values by:
updating the tap coefficient set in the tap coefficient register to another tap coefficient set,
shifting the pixel window along said direction, by updating the window register with another of the pixels of the pixel array,
incrementing the respective values of the even interpolated sub-pixels based on the pixel window in the window register and the another tap coefficient set in the tap coefficient register,
another shifting the pixel window along said direction, by updating the window register with another of the pixels of the pixel array,
incrementing the respective values of the odd interpolated sub-pixels based on the pixel window in the window register and said another tap coefficient set in the tap coefficient register; and
instructions that cause the processor apparatus to output the set of even interpolated sub-pixels and the set of odd interpolated sub-pixels upon die termination condition being met.

13. The computer readable non-transitory medium of claim 12, wherein the instructions that cause the processor apparatus to generate the initial values of the set of even interpolated sub-pixels cause the processor apparatus to generate the initial values for said set having four even interpolated sub-pixels, and to generate the initial value of each of the four even interpolated sub-pixels as a sum of a corresponding two products, each of the two products being a product of a pixel from the pixel window in the window register and a coefficient from the set of coefficients in the coefficient register, and
wherein the instructions that cause the processor apparatus to generate the initial values of the set of odd interpolated sub-pixels cause the processor apparatus to generate the initial values for said set having four odd interpolated sub-pixels, and to generate the initial value of each of the four odd interpolated sub-pixels as a sum of a corresponding two products, each of the two products being a product of a pixel from the shifted pixel window in the window register and a coefficient from said set of coefficients in the coefficient register.

14. The computer readable non-transitory medium of claim 12,
wherein the instructions that cause the processor apparatus to increment the respective values of the four even interpolated sub-pixels cause the processor apparatus to increment each of the values with a sum of another corresponding two products, each of the two products being a product of a pixel from the shifted pixel window in the window register and a coefficient from the another set of coefficients in the tap coefficient register, and
wherein the instructions that cause the processor apparatus to increment the respective values of the four odd interpolated sub-pixels cause the processor apparatus to increment each of the values with a sum of another corresponding two products, each of the two products being a product of a pixel from the again shifted pixel window in the window register and a coefficient from said another set of coefficients in the tap coefficient register.

15. An apparatus for generating interpolated pixels for a pixel array, comprising a logic circuit having a window register, a tap coefficient register, and an input for receiving pixels from a pixel array, wherein the logic circuit is configured to:

load the window register with a pixel window of the pixel array;

load the tap coefficient register with a tap coefficient set;

generate initial values for a set of even interpolated sub-pixels, based on multiplying the pixel window in the window register by the tap coefficient set in the tap coefficient register;

shift the pixel window along a direction of the array, to a shifted pixel window, by updating the window register with another of the pixels of the pixel array;

generate initial values for a set of odd interpolated sub-pixels, based on multiplying said shifted pixel window in the window register by said tap efficient set in the tap coefficient register;

until a given termination condition is met, increment the values of the even interpolated sub-pixels and the values of the odd interpolated sub-pixels wherein the logic circuit is configured to increment the values by:

updating the tap coefficient set in the tap coefficient register to another tap coefficient set, shifting the pixel window along said direction, to another shifted pixel window, by updating the window register with another of the pixels of the pixel array, incrementing the respective values of the even interpolated sub-pixels by an increment based on multiplying the pixel window in the window register by the another tap coefficient set in the tap coefficient register, another shifting the pixel window along said direction, to another shifted pixel window, by updating the window register with another of the pixels of the pixel array, incrementing the respective values of the odd interpolated sub-pixels by an increment based on multiplying the pixel window in the window register by said another tap coefficient set in the tap coefficient register; and output the set of even interpolated sub-pixels and the set of odd interpolated sub-pixels when the given termination condition being met.

16. The apparatus for generating interpolated pixels for a pixel array of claim 15, wherein the logic circuit is integrated in at least one semiconductor die.

17. The apparatus for generating interpolated pixels for a pixel array of claim 15, further comprising a device, selected from the group consisting of a set top box, music player, video player, entertainment unit, navigation device, communication device, personal digital assistant (PDA), fixed location data unit, and a computer, into which the logic circuit is integrated.

18. The method of claim 1, wherein the set of even interpolated sub-pixels comprises an integer number of even interpolated sub-pixels, and the set of odd interpolated sub-pixels comprises a number of odd interpolated sub-pixels equal to said integer number, wherein generating the initial values for the set of even interpolated sub-pixels comprises performing, concurrently, on a multiplier array of the processor, a pair of multiplications corresponding to each of the initial values and generating a corresponding pair of products for each initial value, and performing, concurrently, on the processor, an addition of the products of each pair of products to generate, concurrently, the initial value for each of said integer number of even interpolated sub-pixels, and wherein generating the initial values for the set of odd interpolated sub-pixels comprises performing, concurrently, on the multiplier array a pair of multiplications corresponding to each of the initial values and generating a corresponding pair of products for each initial value, and performing, concurrently, on the processor, an addition of the products of each pair of products to generate, concurrently, the initial value for each of said integer number of odd interpolated sub-pixels.

19. The method of claim 18, further comprising:

offloading the initial values of the set of even interpolated sub-pixels to a memory as stored current values for the set of interpolated even sub-pixels; and offloading the initial values of the set of odd interpolated sub-pixels to the memory as stored current values of the set of interpolated odd sub-pixels, wherein incrementing the values of the set of interpolated even sub-pixels includes retrieving from the memory, as the values of the set of interpolated even sub-pixels to be incremented, the stored current values of the set of interpolated even sub-pixels, and storing the values of the set of interpolated even sub-pixels after the incrementing as the stored current values of the set of interpolated even sub-pixels, and wherein incrementing the values of the set of interpolated odd sub-pixels includes retrieving from the memory, as the values of the set of interpolated odd sub-pixels to be incremented, the stored current values of the set of interpolated odd sub-pixels, and storing the values of the set of interpolated odd sub-pixels after the incrementing as the stored current values of the set of interpolated odd sub-pixels.

20. The method of claim 19, wherein the set of tap coefficients includes a number of pair of tap coefficients equal to the integer number, wherein each pair of tap coefficients corresponds to two taps of a multi-tap interpolation filter corresponding to one of the even interpolated sub-pixels and one of the odd interpolated sub-pixels, wherein generating the initial values of the set of even interpolated sub-pixels comprises, for each initial value, the array of multipliers multiplying one tap co-efficient of a corresponding one pair of tap-coefficients by one pixel in the pixel window to generate a product, the array of multipliers multiplying the other tap co-efficient of the corresponding one pair of tap-coefficients by another pixel in the pixel window to generate another product, and the processor adding the product to the another product to generate, as the initial value of the even interpolated sub-pixel, a sum of two products, the sum of two products comprising a contribution of said two taps to a final value of the even interpolated sub-pixel, and wherein generating the initial values of the set of odd interpolated sub-pixels comprises, for each initial value, the array of multipliers multiplying one tap co-efficient of a corresponding one pair of the tap-coefficients by one pixel in the shifted pixel window to generate a product, the array of multipliers multiplying the other co-efficient of the corresponding one pair of tap-coefficients by another pixel in the shifted pixel window to generate another product, and the processor adding the product to the another product to generate, as the initial value of the odd interpolated sub-pixel, a sum of two products, the sum of two products comprising a contribution of said two taps to a final value of the odd interpolated sub-pixel.

21. The computer-readable non-transitory medium of claim 12 wherein the computer-readable non-transitory medium further includes instructions that, when executed by the processor, cause the processor to offload the initial values of the even interpolated sub-pixels to a memory as stored current values for the set of interpolated even sub-pixels; and offload the initial values of the odd interpolated sub-pixels to the memory as stored current values of the set of interpolated odd sub-pixels, wherein incrementing the values of the set of interpolated even sub-pixels includes retrieving from the memory, as the values of the set of interpolated even sub-pixels to be incremented, the stored current values of the set of interpolated even sub-pixels, and storing the values of the set of interpolated even sub-pixels after the incrementing as the stored current values of the set of interpolated even sub-pixels, and wherein incrementing the values of the set of interpolated odd sub-pixels includes retrieving from the memory, as the values of the set of interpolated odd sub-pixels to be incremented, the stored current values of the set of interpolated odd sub-pixels, and storing the values of the set of interpolated odd sub-pixels after the incrementing as the store current values of the set of interpolated odd sub-pixels.

22. The apparatus for generating interpolated pixels for a pixel array of claim 15, wherein the logic circuit is further configured to:

offload the initial values of the even interpolated sub-pixels to a memory as stored current values for the set of interpolated even sub-pixels; and offload the initial values of the odd interpolated sub-pixels to a memory as stored current values of the set of interpolated odd sub-pixels, wherein incrementing the values of the set of interpolated even sub-pixels includes retrieving from the memory, as the values of the set of interpolated even sub-pixels to be incremented, the stored current values of the set of interpolated even sub-pixels, and storing the values of the set of interpolated even sub-pixels after the incrementing as the stored current values of the set of interpolated even sub-pixels, and wherein incrementing the values of the set of interpolated odd sub-pixels includes retrieving from the memory, as the values of the set of interpolated odd sub-pixels to be incremented, the stored current values of the set of interpolated odd sub-pixels, and the values of the set of interpolated odd sub-pixels after the incrementing as the stored current values of the set of interpolated odd sub-pixels.

* * * * *